(12) United States Patent
Onishi et al.

(10) Patent No.: US 8,968,966 B2
(45) Date of Patent: Mar. 3, 2015

(54) FUEL BATTERY

(75) Inventors: Takenori Onishi, Osaka (JP); Tomohisa Yoshie, Osaka (JP); Hirotaka Mizuhata, Osaka (JP); Mutsuko Komoda, Osaka (JP); Shinobu Takenaka, Osaka (JP); Masashi Muraoka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 92 days.

(21) Appl. No.: 13/566,043

(22) Filed: Aug. 3, 2012

(65) Prior Publication Data

US 2013/0034793 A1 Feb. 7, 2013

(30) Foreign Application Priority Data

Aug. 3, 2011 (JP) ................................. 2011-170051

(51) Int. Cl.
*H01M 2/14* (2006.01)
*H01M 8/04* (2006.01)

(52) U.S. Cl.
USPC ............ 429/516; 429/506; 429/512; 429/514

(58) Field of Classification Search
None
See application file for complete search history.

(56) References Cited

U.S. PATENT DOCUMENTS

| 6,127,058 A * | 10/2000 | Pratt et al. ..................... 429/480 |
|---|---|---|
| 2005/0100773 A1 | 5/2005 | Kashino et al. |
| 2006/0046126 A1 | 3/2006 | Kubota et al. |
| 2007/0059575 A1 * | 3/2007 | Kan et al. ....................... 429/30 |
| 2010/0273078 A1 * | 10/2010 | Takahashi et al. ........... 429/442 |

FOREIGN PATENT DOCUMENTS

| JP | 2004-079506 | 3/2004 |
|---|---|---|
| JP | 2006-093119 | 4/2006 |

* cited by examiner

*Primary Examiner* — Cynthia K. Walls
(74) *Attorney, Agent, or Firm* — Nixon & Vanderhye P.C.

(57) ABSTRACT

Provided is a fuel battery including: a fuel battery cell assembly having at least two fuel battery cells coplanarly disposed, the fuel battery cell including a membrane electrode assembly having an anode, an electrolytic membrane, and a cathode stacked on one another in this order, and a flow channel plate provided on an anode side and having on an anode-side surface thereof an in-cell fuel flow channel through which liquid fuel flows; and a fuel distributor having an out-cell fuel flow channel connected to each of the in-cell fuel flow channels to distribute the liquid fuel to the fuel battery cells.

7 Claims, 15 Drawing Sheets

FUEL BATTERY

This nonprovisional application is based on Japanese Patent Application No. 2011-170051 filed on Aug. 3, 2011 with the Japan Patent Office, the entire contents of which are hereby incorporated by reference.

BACKGROUND OF THE INVENTION

1. Field of the Invention

The present invention relates to a fuel battery including a plurality of fuel battery cells coplanarly disposed.

2. Description of the Background Art

There are increasing expectations for practical use of fuel batteries as a novel power source in mobile electronic devices that underpin the information-driven society. The fuel batteries may be classified into different types depending on what electrolytic materials and fuels are used, such as phosphoric type, melting carbonate type, solid electrolyte type, solid polymer type, and direct alcohol type. Of these fuel batteries of different types, the direct alcohol fuel battery and the solid polymer type fuel battery, in which solid polymer ion-exchange membranes are used as an electrolytic material, generate power with high efficiency at normal temperatures. Therefore, it is currently discussed to launch these fuel batteries in the market as downsized power batteries to be mostly used in mobile electronic devices.

The direct alcohol fuel battery, in which alcohol or an alcohol aqueous solution is used as fuel, is structurally simplified and space-saving because it is relatively easy to design a storeroom for fuel as compared to other fuel batteries in which gases are used as fuel. Because of these advantages, the direct alcohol fuel battery has a particularly high potential as a downsized power cell useful in mobile electronic devices.

Conventionally, in fuel batteries, in order to feed mobile electronic devices with sufficient power that cannot be generated by one fuel battery cell, a plurality of fuel battery cells are electrically connected and combined with one another (fuel cell stack). An example thereof is a fuel battery including a plurality of fuel battery cells coplanarly disposed (hereinafter, also referred to as "planarly integrated fuel battery") as disclosed in Japanese Patent Laying-Open No. 2004-079506 (Patent Document 1) and Japanese Patent Laying-Open No. 2006-093119 (Patent Document 2).

In order to use the planarly integrated fuel battery as a power source in different electronic devices such as mobile electronic devices, it is a very significant factor that the structure of the planarly integrated fuel battery can be designed in a flexible manner depending on various shapes and area dimensions of spaces limitedly available for the fuel battery in the electronic devices. Such a designing flexibility greatly contributes to improvements of production efficiency (simplified production process) and production costs of the fuel battery.

In general, such a conventional planarly integrated fuel battery described in Patent Documents 1 and 2 employs a structure in which a plurality of fuel battery cells share a fuel feeder. The fuel feeder is more specifically a unit where fuel to be supplied to the fuel battery cells is kept or distributed, and a liquid fuel storeroom 3 of Patent Document 3 and a bipolar plate 20 of Patent Document 2 corresponds to the fuel feeder. To apply the planarly integrated fuel battery thus structured to electronic devices having fuel battery housing spaces of different shapes and area dimensions, the integration of fuel battery cells requires more than just a simple design change. In fact, the whole fuel feeder and a system structure pertinent thereto need to be totally redesigned. Thus, it requires a complicated process to tailor the structure of the fuel battery through design changes for any electronic devices to which the fuel battery is applied, whereby production efficiency and production costs of the fuel battery are deteriorated.

SUMMARY OF THE INVENTION

An object of the present invention is to provide a fuel battery that can be structurally redesigned easily and flexibly depending on electronic devices to which the fuel battery is applied.

To achieve the above object, the present invention provides a planarly integrated fuel battery including fuel battery cells, wherein the fuel battery cells are directly provided with fuel flow channels for fuel distribution to be modularized. In other words, a fuel feeder, which is conventionally a single member, is divided in two units. One of the units is provided independently from the fuel battery cells to serve as a fuel flow channel for guiding (distributing) fuel to the fuel battery cells (fuel distributor). The other unit is embedded in the fuel battery cells to serve as fuel flow channels for in-plane diffusion of fuel in the fuel battery cells. The fuel battery cells are thus modularized as cells having the fuel flow channels. When the modules (fuel battery cells having the fuel flow channels) and the fuel distributor are coupled with each other, the production of the planarly integrated fuel battery is completed.

Such a planarly integrated fuel battery is readily applicable to electronic devices having fuel battery housing spaces of variously different shapes and area dimensions, as long as the fuel distributor alone is redesigned depending on the number of the modules, different layout patterns, and/or any structural needs, without making design changes to the modules.

More specifically, the present invention provides a fuel battery including: a fuel battery cell assembly having at least two fuel battery cells coplanarly disposed, the fuel battery cell including a membrane electrode assembly having an anode, an electrolytic membrane, and a cathode stacked on one another in this order, and a flow channel plate provided on an anode side and having on an anode-side surface thereof an in-cell fuel flow channel through which liquid fuel flows; and a fuel flows distributor having an out-cell fuel flow channel connected to each of the in-cell fuel flow channels to distribute the liquid fuel to the fuel battery cells.

According to a preferred embodiment, the fuel distributor has an inlet port for introducing the liquid fuel, and the out-cell fuel flow channel of the fuel distributor includes a main flow channel connected to the inlet port, and branched flow channels connecting the main flow channel to each of the in-cell fuel flow channels.

According to another preferred embodiment, the fuel battery cell assembly includes at least two fuel battery cells linearly disposed. In this case, all of end portions of the in-cell fuel flow channels provided in the at least two fuel battery cells connected to the out-cell fuel flow channel are preferably located on a side surface of the fuel battery cell assembly, all of end portions of the out-cell fuel flow channel provided in the fuel distributor connected to the in-cell fuel flow channels are located on a side surface of the fuel distributor, and the fuel distributor is disposed such that the side surface of the fuel battery cell assembly and the side surface of the fuel distributor face each other.

The fuel battery may be structured such that all of end portions of the in-cell fuel flow channels provided in the at least two fuel battery cells connected to the out-cell fuel flow channel are located on a main surface of the flow channel plate, all of end portions of the out-cell fuel flow channel provided in the fuel distributor connected to the in-cell fuel flow channels are located on a surface of the fuel distributor, and the fuel distributor is disposed to partly overlap with the flow channel plate such that the end portions of the in-cell fuel flow channels are located on the end portions of the out-cell fuel flow channel.

The fuel battery cell may further include: a liquid-gas separation layer disposed between the membrane electrode assembly and the flow channel plate and having permeability for a vaporized matter of the liquid fuel; and an intervening layer disposed between the liquid-gas separation layer and the flow channel plate so as to cover the in-cell fuel flow channels and having a contact angle to water of less than 70 degrees. Alternatively, the fuel battery cell may further include a liquid-gas separation layer disposed on the anode-side surface of the flow channel plate so as to cover the in-cell fuel flow channels and having permeability for a vaporized matter of the liquid fuel.

The fuel battery cell may further include: an anode collector layer disposed on the anode; and a cathode collector layer disposed on the cathode. An example of the fuel battery according to the present invention is a direct alcohol fuel battery.

The present invention provides a fuel battery that can be structurally redesigned in a facilitated and flexible manner depending on electronic devices to which the fuel battery is applied. The fuel battery according to the present invention is a useful power source for electronic devices, particularly, mobile electronic devices.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, a fuel battery according to the present invention will be described in detail based on preferred embodiments thereof.

Figure 1:
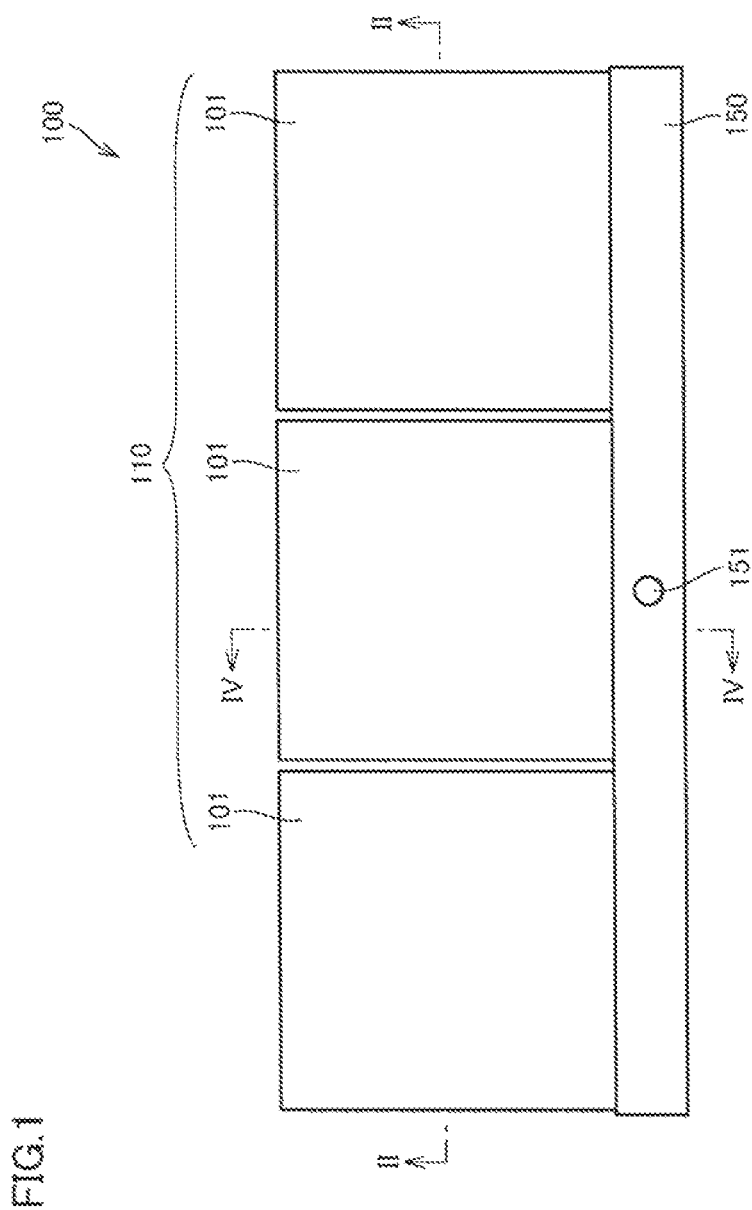
FIG. 1 is a schematic top view illustrating one example of a fuel battery according to the present invention.
Figure 2:
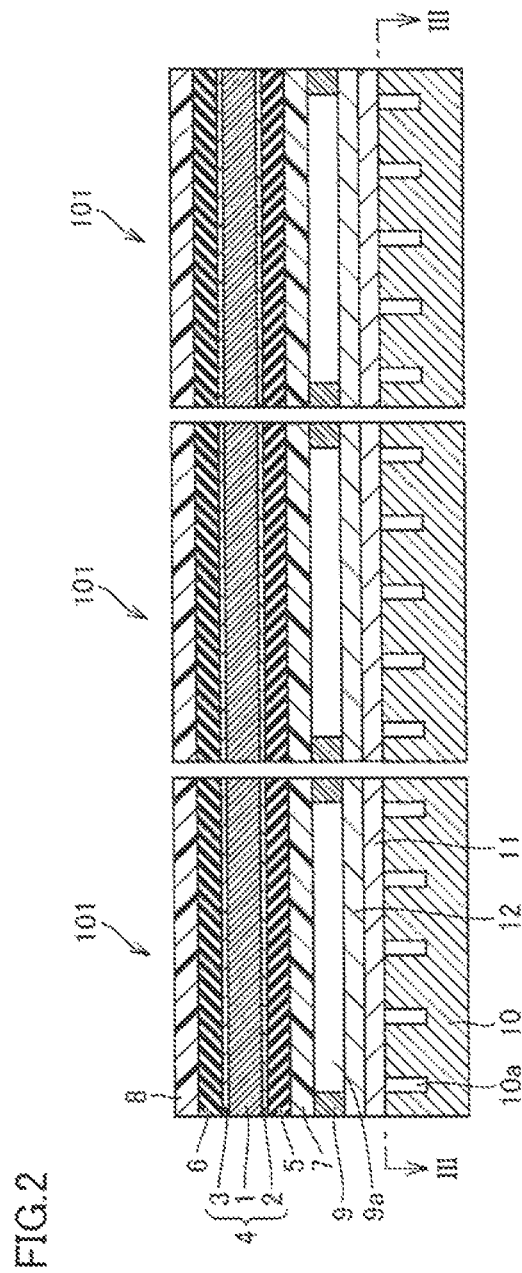
FIG. 2 is a schematic sectional view taken along II-II of FIG. 1.
Figure 3:
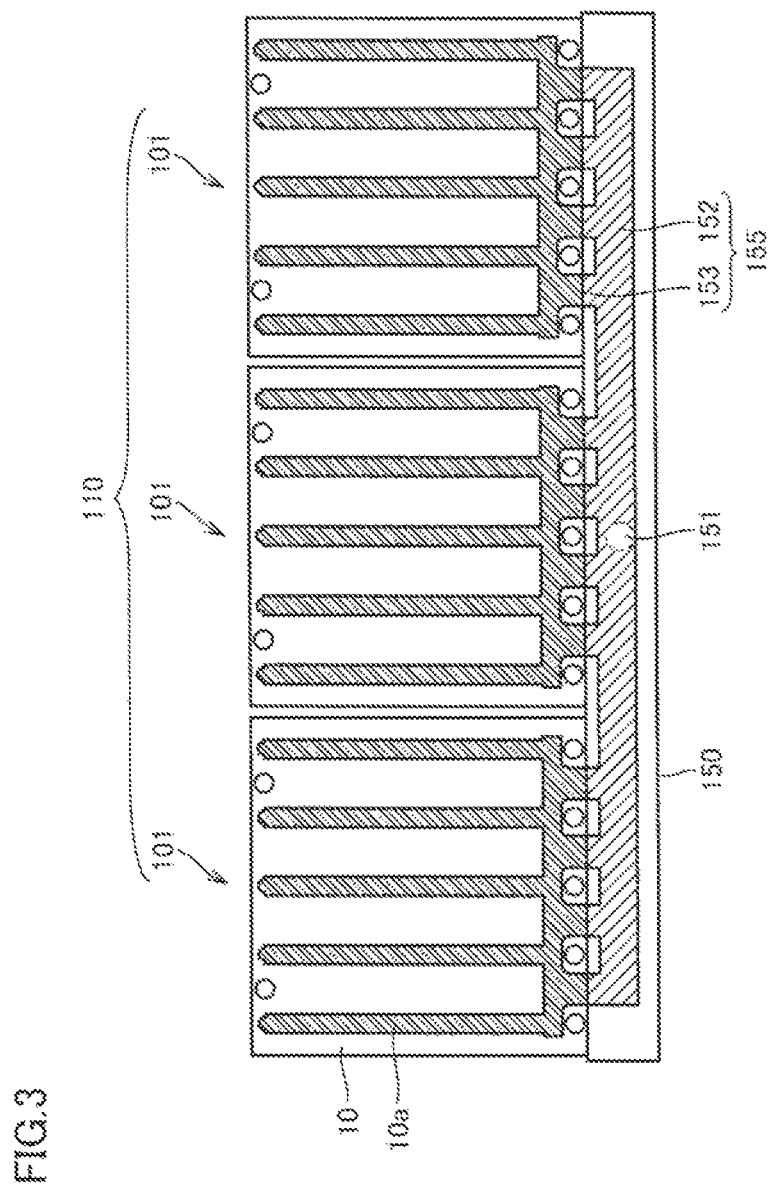
FIG. 3 is a schematic sectional view taken along III-III of FIG. 2.
Figure 4:
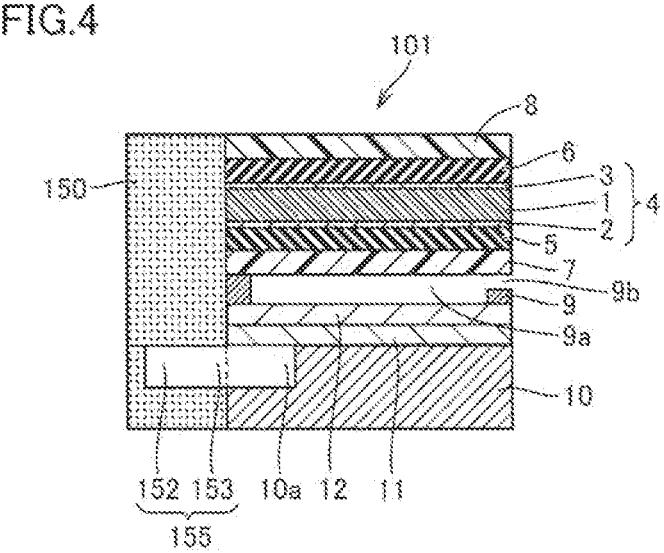
FIG. 4 is a schematic sectional view taken along IV-IV of FIG. 1.

FIG. 1 is a schematic top view illustrating one example of a fuel battery according to the present invention. FIG. 2 is a schematic sectional view taken along II-II of FIG. 1. FIG. 3 is a schematic sectional view taken along III-III of FIG. 2. FIG. 4 is a schematic sectional view taken along IV-IV of FIG. 1.

A fuel battery 100 illustrated in these figures is a planarly integrated fuel battery including three fuel battery cells 101 coplanarly disposed. Specifically, fuel battery 100 includes a fuel battery cell assembly 110 having three fuel battery cells 101 linearly disposed, and a fuel distributor 150 positionally set adjacent to a side surface of fuel battery cell assembly 110. The fuel battery cells constituting fuel battery 100 are electrically connected to one another in series or in parallel. The fuel battery cell assembly according to the present invention is a collective term of all of the fuel battery cells constituting the fuel battery.

Referring to FIG. 2, fuel battery cells 101 constituting fuel battery cell assembly 110 each includes: a membrane electrode assembly 4 having an anode 2, an electrolytic membrane 1, and a cathode 3 stacked on one another in this order; an anode collector layer 5 provided on anode 2 and electrically connected to anode 2; a cathode collector layer 6 provided on cathode 3 and electrically connected to cathode 3; an anode moisture-retaining layer 7 provided on anode collector layer 5 in contact with anode collector layer 5; a cathode moisture-retaining layer 8 provided on cathode collector layer 6 in contact with cathode collector layer 6; a flow channel plate 10 provided on an anode 2 side (below anode 2) and having in-cell fuel flow channels 10a through which liquid fuel flows (for in-plane diffusion of the liquid fuel in the fuel battery cells) on an anode 2-side surface thereof; a liquid-gas separation layer 12 disposed between membrane electrode assembly 4 and flow channel plate 10 and having permeability for a vaporized matter of the liquid fuel; a vaporized fuel plate 9 disposed between liquid-gas separation layer 12 and anode moisture-retaining layer 7 and including a vaporized fuel container 9a; and an intervening layer 11 disposed between liquid-gas separation layer 12 and flow channel plate 10 so as to cover in-cell fuel flow channels 10*a*.

Thus, fuel battery cells 101 are configured as modules respectively embedded with fuel flow channels (in-cell fuel flow channels 10*a*) in charge of in-plane diffusion of the liquid fuel in the fuel battery cells. When the modules are coupled with fuel distributor 150, production of planarly integrated fuel battery 100 is completed.

Referring to FIGS. 3 and 4, fuel distributor 150 is a structural element provided independently from fuel battery cells 101 to distribute the liquid fuel introduced through an inlet port 151 to the fuel battery cells. Fuel distributor 150 has an out-cell fuel flow channel 155 connected to in-cell fuel flow channels 10*a*. Out-cell fuel flow channel 155 includes, for example, a main flow channel 152 connected to inlet port 151, and branched flow channels 153 respectively connecting main flow channel 152 to in-cell fuel flow channels 10*a*. According to the embodiment illustrated in FIGS. 1 to 4, fuel distributor 150 is formed in a substantially rectangular shape and adjacently attached to a side surface of fuel battery cell assembly 110 where entry end portions of in-cell fuel flow channels 10*a* of fuel battery cells 101 (end portions connected to out-cell fuel flow channel 155) are located. Inlet port 151 is provided at an almost center position of fuel distributor 150 in a longitudinal direction thereof (in parallel with an array direction of the fuel battery cells).

The fuel battery according to the present invention exemplified by the embodiment described above is structurally characterized in that the fuel battery cells having the in-cell fuel flow channels are modularized. Therefore, the fuel battery is readily applicable to electronic devices having fuel battery housing spaces of different shapes and area dimensions, by merely redesigning the shape of the fuel distributor depending on the number of modules, different layout patterns, and/or any structural needs. The flexibility in redesigning the structure of the fuel battery greatly contributes to improvements of production efficiency (simplified production process) and reduction in production costs of the fuel battery.

Although the plurality of fuel battery cells constituting the fuel battery may be disposed in any suitable manner, the fuel battery cells are preferably linearly disposed as illustrated in the embodiment of FIGS. 1 to 4 in order to reduce an area dimension of the fuel battery and simplify the connectivity to the fuel distributor. In this case, in order to improve the connectivity to the fuel distributor, the plurality of fuel battery cells are preferably disposed such that all of entry end portions of the in-cell fuel flow channels (end portions connected to the out-cell fuel flow channel) are located on an outer surface of the linear fuel battery cell assembly. As illustrated in the embodiment of FIGS. 1 to 4, for example, the plurality of fuel battery cells are disposed such that all of entry end portions of the in-cell fuel flow channels are located on a side surface X of the fuel battery cell assembly, all of exit end portions of the out-cell fuel flow channel of the fuel distributor (end portions connected to the in-cell fuel flow channels, exit end portions of branched flow channels 153 according to the embodiment illustrated in FIGS. 1 to 4) are located on a side surface Y of the fuel distributor, and the fuel distributor is positionally set on a lateral side of the linear fuel battery cell assembly so that side surface X and side surface Y face each other.

Figure 5:
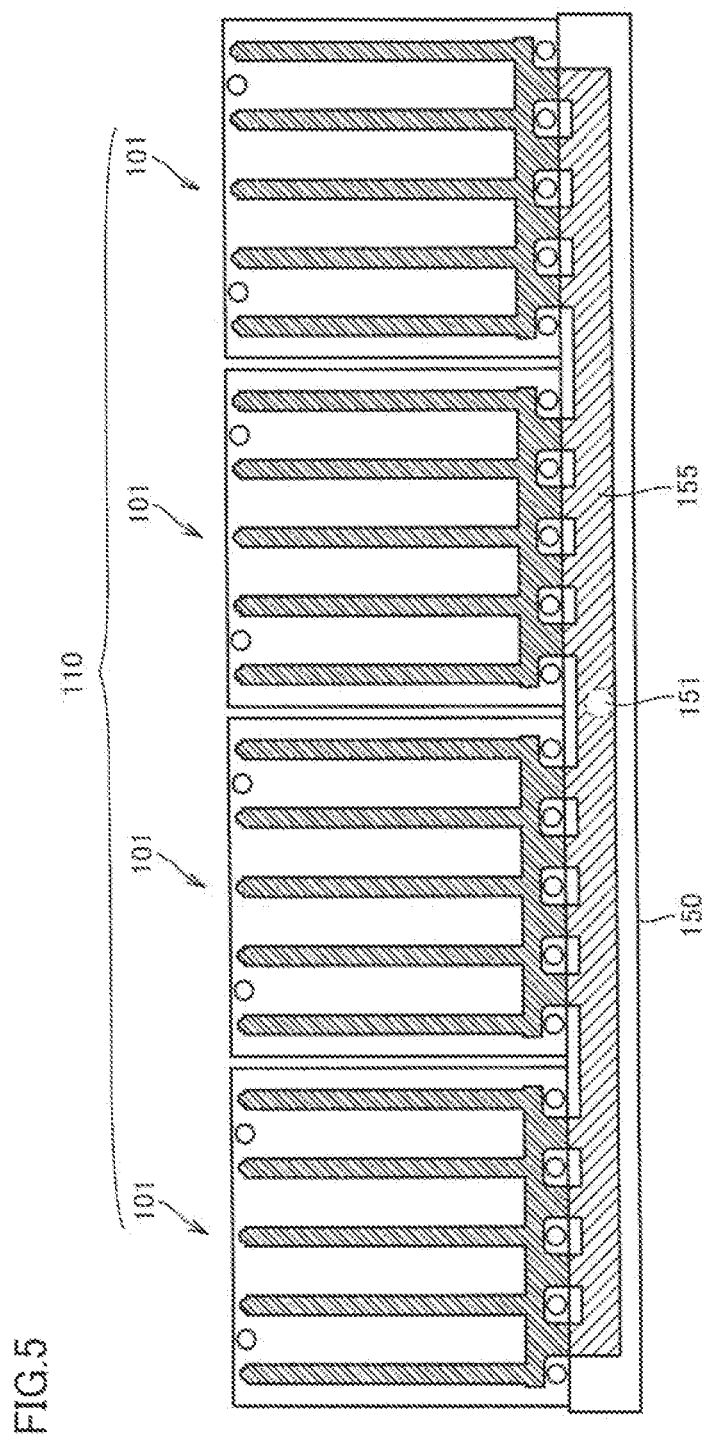
FIG. 5 is a schematic top view illustrating another example of the fuel battery according to the present invention.

The number of the fuel battery cells of the fuel battery (fuel battery cell assembly) is not particularly limited as long as at least two fuel battery cells are provided. Preferably, at least three fuel battery cells are provided. FIG. 5 is a schematic sectional view similar to FIG. 3 illustrating the fuel battery including fuel battery cell assembly 110 where four fuel battery cells are linearly disposed. Fuel battery cell assembly 110 may include a plurality of fuel battery cells linearly disposed in two or more rows. For example, the two rows of cells may be connected to two opposite side surfaces of a fuel distributor. The fuel battery according to the present invention may include at least two fuel distributors. The scope of the invention encompasses such a modified example in which a fuel distributor is interposed between one fuel battery cell and another fuel battery cell.

Hereinafter, structural elements constituting the fuel battery according to the present invention are described in further detail.

(1) Fuel Battery Cell

[Electrolytic Membrane]

The functions of electrolytic membrane 1 constituting membrane electrode assembly 4 are; permeability for protons from anode 2 to cathode 3, and electrical insulation between anode 2 and cathode 3 to prevent short circuit. The electrolytic membrane 1 may be made of any material as long as it has electrical insulation properties and proton conductivity. The electrolytic membrane may be, for example, a polymeric membrane, an inorganic membrane, or a composite membrane. The polymeric membrane may be a perfluorosulfonic acid-based electrolytic membrane, specific examples of which are; Nafion (registered trademark, supplied by DuPont), Acipiex (registered trademark, supplied by Asahi Kasci Corporation), and Flemion (registered trademark, supplied by Asahi Kasei Corporation). Other examples of the electrolytic membrane may include hydrocarbon-based electrolytic membranes including styrene-based graft polymer, trifluorostyrene derivative copolymer, sulfonated polyarylene ether, sulfonated polyether ether ketone, sulfonated polyimide, sulfonated polybenzimidazole, phosphonated polybenzimidazole, and sulfonated potyphosphazene.

Examples of the inorganic membrane include membranes made of phosphoric acid glass, cesium sulfate, polytungstophoric acid, and polyphosphoric acid ammonium. The composite membrane, for example, mixedly includes an inorganic material such as tungstic acid, cesium sulfate, or polytungstophoric acid, and an organic material such as polyimide, polyether ether ketone, or perfluorosulfonic acid. Electrolytic membrane 1 has a thickness of, for example, 1 μm to 200 μm.

[Anode and Cathode]

Anode 2 provided on a surface of electrolytic membrane 1 and cathode 3 provided on the other surface thereof are respectively provided with a porous catalytic layer including at least a catalyst and an electrolyte. The catalyst of anode 2 (anode catalyst) catalyzes a reaction where protons and electrons are generated from the fuel, and the electrolyte transfers the generated protons to electrolytic membrane 1. The catalyst of cathode 3 catalyzes a reaction where water is generated from the protons transferred by the electrolyte and oxidants (for example, air).

The catalysts of anode 2 and cathode 3 may be supported on a surface of a conductor such as carbon or titanium. These catalysts are preferably supported on a surface of a carbon conductor or a titanium conductor having hydrophilic functional groups such as hydroxyl groups or carboxyl groups. Accordingly, anode 2 and cathode 3 have better water retention characteristics. The better water retention characteristics lead to improvements of resistance generated in electrolytic membrane 1 by the transfer of protons and electrical potential distributions in anode 2 and cathode 3.

Anode 2 and cathode 3 may respectively include on the catalytic layers an anode conductive porous layer (anode gas diffusion layer) and a cathode conductive porous layer (cathode gas diffusion layer). These conductive porous layers enable in-plane diffusion of gas supplied to anode 2 or cathode 3 (vaporized fuel or oxidants). The conductive layers also transmit and receive electrons to and from the catalytic layers. Preferable materials of the anode conductive porous layer and the cathode conductive porous layer are porous materials including carbon materials, conductive polymers, noble metals such as Au, Pt, and Pd, transition metals such as Ti, Ta, W, Nb, Ni, Al, Cu, Ag, and Zn, nitrides or carbides of these metals, and alloys containing these metals such stainless steel. In the case where metals having poor corrosion resistance under acidic atmosphere, for example, Cu, Ag, or Zn are used, corrosion-resistant noble metals, for example, Au, Pt, and Pd, conductive polymers, conductive nitrides, conductive carbides, and conductive oxides may be used for surface treatment (coating formation). More specific examples of the anode conductive porous layer and the cathode conductive porous layer preferably include the aforementioned noble metals, foam metals including transition metals and alloys, metallic fabrics, and metallic sintered compact, and epoxy resin films suitably containing carbon papers, carbon cloths, and carbon particles.

[Anode Collector Layer and Cathode Collector Layer]

Anode collector layer 5 and cathode collector layer 6 are respectively provided on anode 2 and cathode 3. The functions of anode collector layer 5 and cathode collector layer 6 are to collect electrons and provide electrical wirings in anode 2 and cathode 3. A preferable material of the collector layers is metals because small specific resistances prevent voltage drops when currents are planarly fetched. More particularly, metals having corrosion resistance under acidic atmosphere and electron transferability are desirably used. Such metals are, for example, noble metals such as Au, Pt, and Pd, transition metals such as Ti, Ta, W, Nb, Ni, Al, Cu, Ag, and Zn, nitrides and carbides of these metals, and alloys containing these metals such as stainless steel. In the case where metals having poor corrosion resistance under acidic atmosphere, for example, Cu, Ag, and Zn are used, corrosion-resistant noble metals, for example, Au, Pt, and Pd, conductive polymers, conductive nitrides, conductive carbides, and conductive oxides may be used for surface treatment (coating formation). In the case where the anode conductive porous layer and the cathode conductive porous layer are metallic layers having a relatively high electrical conductivity, the anode collector layer and the cathode collector layer may be omitted.

Specifically, anode collector layer 5 may be a flat plate having a mesh shape or a punching metal shape formed from any of the aforementioned metallic materials and having a plurality of through holes (openings) formed so as to penetrate in a thickness direction thereof to guide the vaporized fuel to anode 2. The through holes further serve as paths for guiding a by-product gas (for example, $CO_2$ gas) generated in the catalytic layer of anode 2 toward vaporized fuel container 9a. Similarly, cathode collector layer 6 may be a flat plate having a mesh shape or a punching metal shape formed from any of the aforementioned metallic materials and having a plurality of through holes (openings) formed so as to penetrate in a thickness direction thereof to feed the catalytic layer of cathode 3 with the oxidants (for example, air outside the fuel battery).

[Flow Channel Plate]

Referring to FIG. 3, flow channel plate 10 is a member formed in a plate shape and having in-cell fuel flow channels 10a through which liquid fuel flows. In-cell fuel flow channels 10a are formed on the anode 2-side surface of flow channel plate 10. Flow channel plate 10 is provided on an anode-2 side of the fuel battery. In-cell fuel flow channels 10a may be grooves (dents) formed in a surface of the plate-shape member. The shape (pattern) of in-cell fuel flow channels 10a are not particularly limited as long as they are uniformly spaced at equal intervals in an area as large as possible on the surface of the flow channel plate so that the whole surface of anode 2 is equally supplied with the vaporized fuel.

FIGS. 6 to 15 illustrate preferable examples of the flow channel pattern. All of in-cell fuel flow channels 10a illustrated in FIGS. 6 to 15 (shaded parts) consist of grooves (dents). In-cell fuel flow channels 10a illustrated in FIG. 6 (structured identical to the illustrations of FIGS. 3 and 5) are connected to the out-cell fuel flow channel at four positions (there are four flow channel inlets). The four flow channels connected to the out-cell fuel flow channel converge into a flow channel, and five branched flow channels diverge therefrom and extend at equal intervals. In the event of air bubbles entering through the flow channels, the liquid fuel inflow is possibly disturbed in some parts of the flow channels connected to the out-cell fuel flow channel. When such an event occurs, the flow channels thus structured invite the liquid fuel inflow through the other parts of the flow channels connected to the out-cell fuel flow channel, spreading the liquid fuel entirely in in-cell fuel flow channels 10a. The circles (seven in total) drawn on peripheral edges of flow channel plate 10 in FIG. 6 denote threaded holes used to fasten the structural elements (the same applies to FIGS. 3, 5, 7 to 15, and 20).

Figure 6:
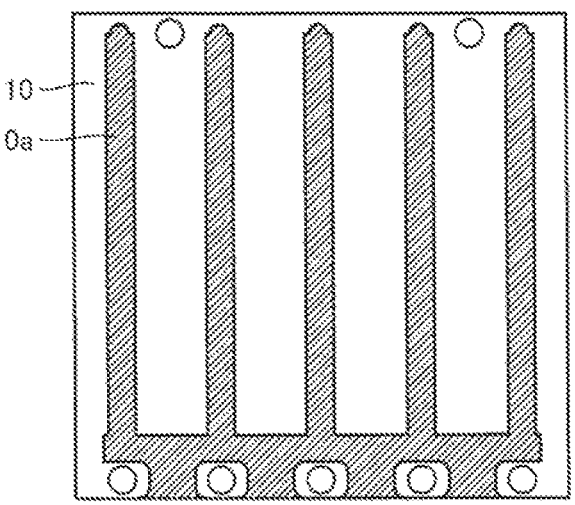
FIG. 6 is a schematic top view illustrating one example of a flow channel plate.
Figure 7:
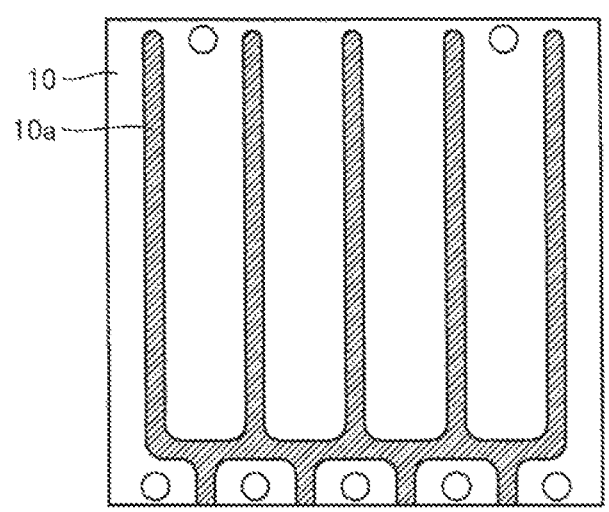
FIG. 7 is a schematic top view illustrating another example of the flow channel plate.

In the example illustrated in FIG. 7, the flow channels are reduced in width as compared to the flow channels illustrated in FIG. 6 to enhance a capillary action. Further, corner portions of the flow channels are rounded (curvature) to reduce pressure loss during the transport of the liquid fuel. Accordingly, the liquid fuel is more easily spread entirely in in-cell fuel flow channels 10a.

Figure 8:
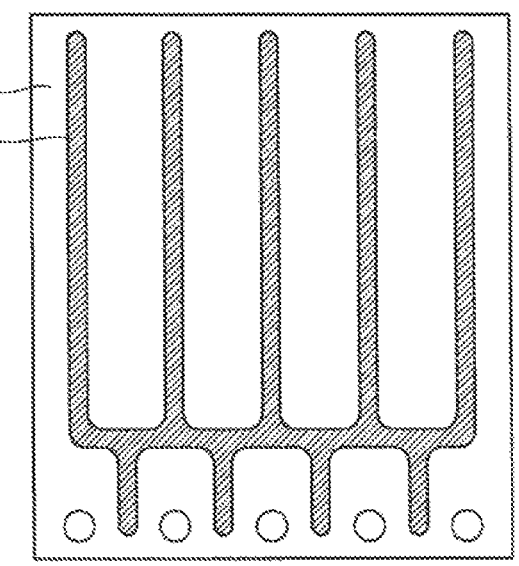
FIG. 8 is a schematic top view illustrating still another example of the flow channel plate.

The in-cell fuel flow channels illustrated in FIG. 8 are different from those illustrated in FIG. 7 in that the liquid fuel does not flow in from the side surface of the flow channel plate 10 but flows in from an upper surface thereof. In other words, the four entry end portions of in-cell fuel flow channels 10a are not located on the side surface of flow channel plate 10 but are located on one of surfaces thereof (main surface). When such a flow channel plate is used, all of exit end portions of the out-cell fuel flow channel provided in the fuel distributor connected to the in-cell fuel flow channels are located on the same surface, and a section of the fuel distributor where the exit end portions of the out-cell fuel flow channel are located is overlapped with a part of the main surface of the flow channel plate where the entry end portions of in-cell fuel flow channels 10a are located (that is, the fuel distributor and the flow channel plate partly overlap with each other so that the entry end portions of the in-cell fuel flow channels and the exit end portions of the out-cell fuel flow channel are connected in a direction of the overlap). When the flow channel plate and the fuel distributor are thus coupled with each other, the liquid fuel inflow from the out-cell fuel flow channel to the in-cell fuel flow channels follows a direction where a force is applied to join and fasten the structural elements of the fuel battery (direction in which the structural elements are layered). This ensures that the liquid fuel is prevented from leaking through the connected parts of the fuel flow channels.

Figure 9:
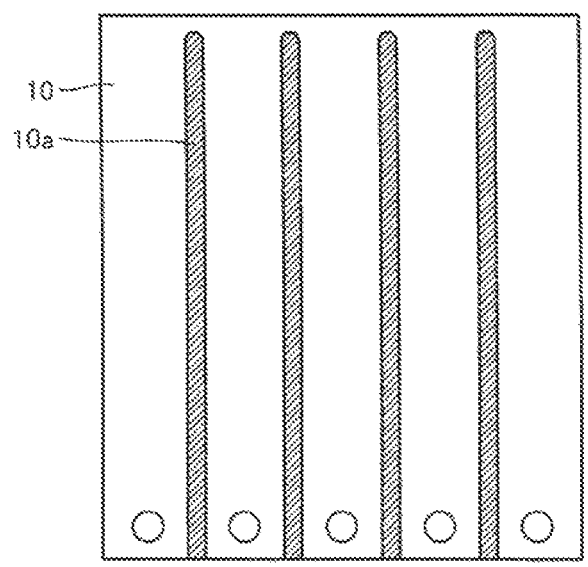
FIG. 9 is a schematic top view illustrating still another example of the flow channel plate.
Figure 10:
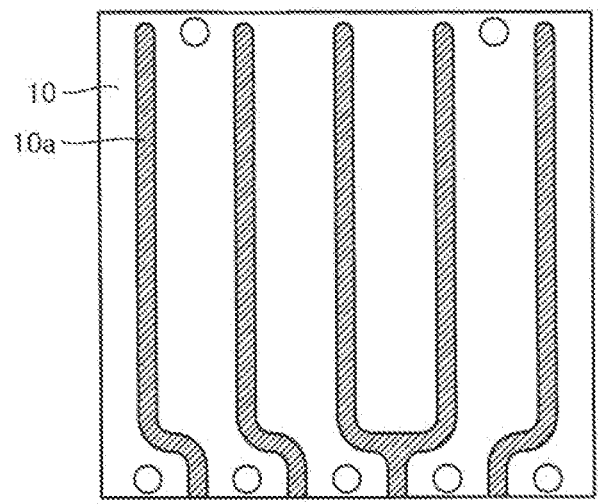
FIG. 10 is a schematic top view illustrating still another example of the flow channel plate.

The in-cell fuel flow channels illustrated in FIG. 9 consist of a plurality of unbranched flow channels linearly formed. The flow channels thus structured effectively reduce pressure loss during the transport of the liquid fuel. The in-cell fuel flow channels illustrated in FIG. 10 are different from those illustrated in FIG. 7 in that the branched parts are provided as few as possible. Accordingly, the illustrated structure reduces the likelihood that air bubbles sucked into the unbranched parts of the flow channels block the entry of the liquid fuel to the branched parts.

Figure 11:
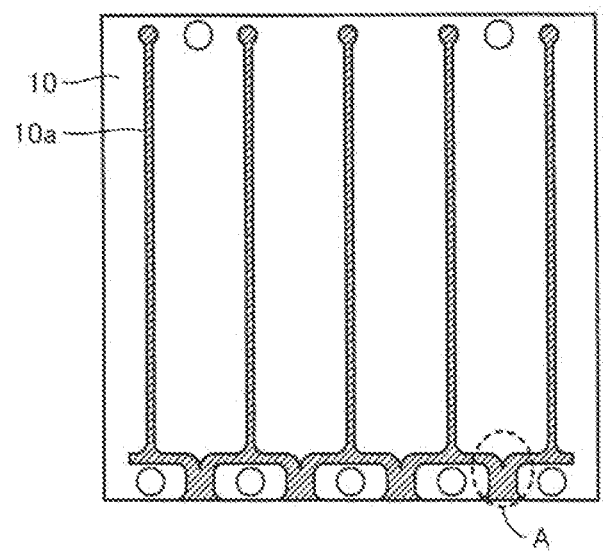
FIG. 11 is a schematic top view illustrating still another example of the flow channel plate.
Figure 12:
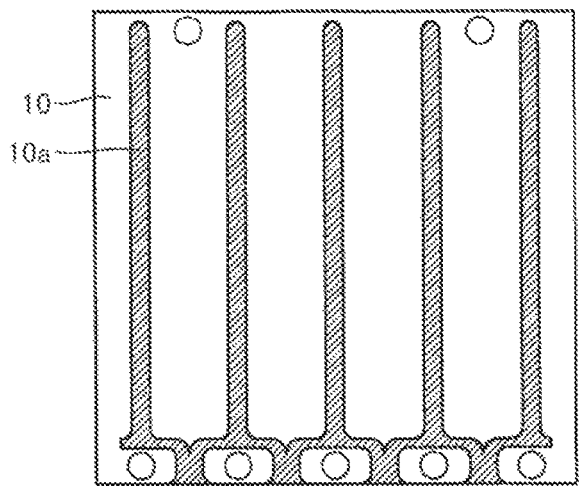
FIG. 12 is a schematic top view illustrating still another example of the flow channel plate.

In the in-cell fuel flow channels illustrated in FIG. 11, pressure loss is increased by reducing the width of the flow channels in sections A of FIG. 11. According to the flow channel structure, the liquid fuel inflow through all of the four entry end portions in in-cell fuel flow channels 10a advances into the branched flow channels, allowing the liquid fuel to be equally distributed to the branched flow channels. The in-cell fuel flow channels illustrated in FIG. 12 are structured such that the branched flow channels illustrated in FIG. 11 are increased in width to reduce pressure loss in the branched flow channels during the transport of the liquid fuel.

Figure 13:
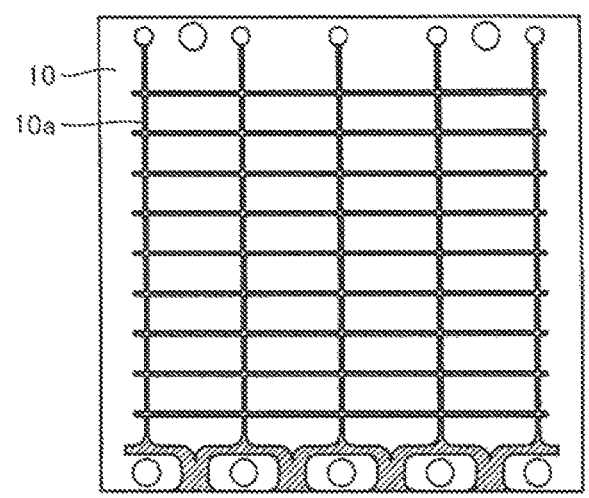
FIG. 13 is a schematic top view illustrating still another example of the flow channel plate.

The example illustrated in FIG. 13 has in-cell fuel flow channels formed in a network shape. The flow channels thus structured can spread the liquid fuel entirely in in-cell fuel flow channels 10a even if air bubbles are sucked into any of the flow channels.

Figure 14:
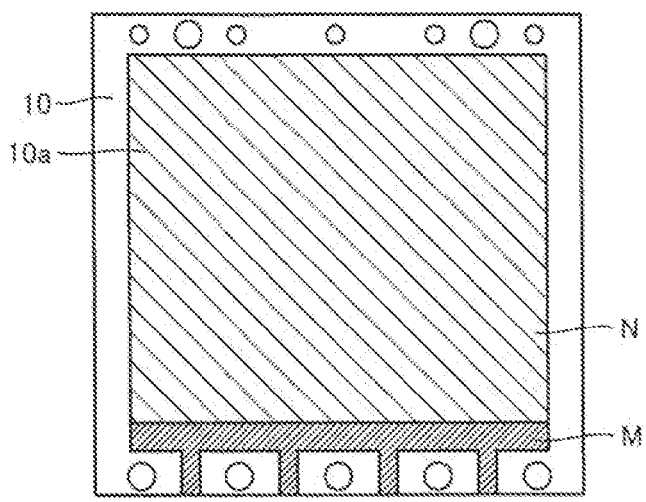
FIG. 14 is a schematic top view illustrating still another example of the flow channel plate.
Figure 15:
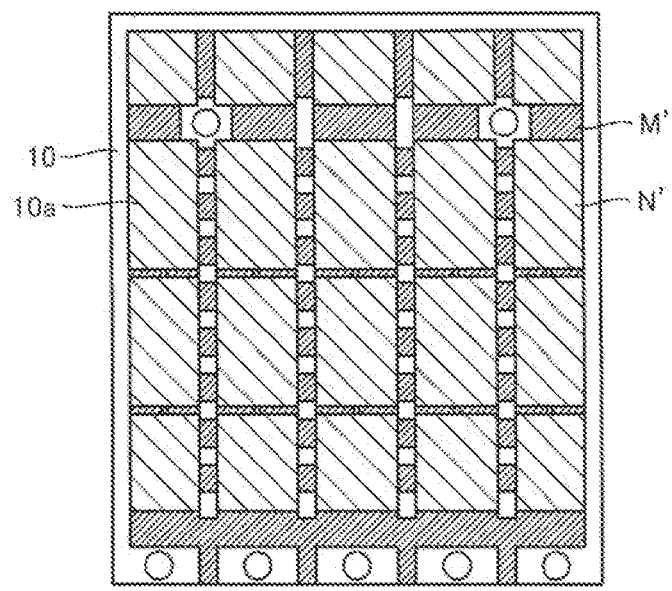
FIG. 15 is a schematic top view illustrating still another example of the flow channel plate.

In the example illustrated in FIG. 14, a large dented portion is formed in the surface of the flow channel plate to provide in-cell fuel flow channel 10a in the shape of a vessel. The flow channel thus structured allows an adequate quantity of liquid fuel to be equally supplied to the entire anode. Such a barrel-shape flow channel may be provided with beams in a longitudinal direction and/or a lateral direction as illustrated in FIG. 15 to increase a structural strength of the flow channel plate. Referring to FIG. 14, a region M and a region N are both dented portions, wherein region N is formed in a depth larger than the other. Referring to FIG. 15, a region M (including other similarly hatched regions) and a region N' (including other similarly hatched regions) are both dented portions, wherein region N' is formed in a larger depth than the other.

Although the width and depth of the in-cell fuel flow channel are not particularly limited, the width is, for example, about 0.2 mm to 1.5 mm (larger than these widths particularly in the barrel-shape flow channel), and the depth is, for example, about 0.1 mm to 0.6 mm.

Flow channel plate 10 can be formed from a plastic material or a metallic material. Examples of the plastic material include: polyphenylene sulfide (PPS), polymethyl methacrylate (PMMA), acrylonitrile butadiene styrene (ABS), polyvinyl chloride, polyethylene (PE), polyethylene terephthalate (PET), polyether ether ketone (PEEK), polytetrafluoroethylene (PTFE), and polyvinylidene fluoride (PVDF). Examples of the metallic material include: titanium, aluminum, and alloy materials such as stainless steel and magnesium alloy.

[Vaporized Fuel Plate]

Figure 16A:
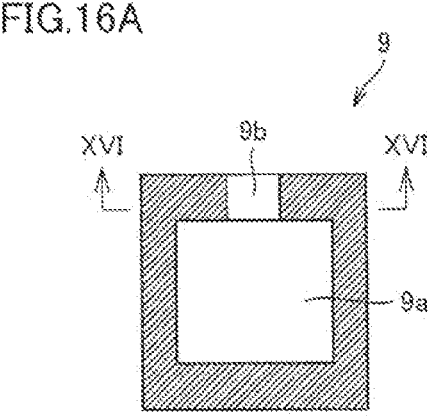
FIG. 16A is a schematic top view illustrating one example of a vaporized fuel plate.
Figure 16B:
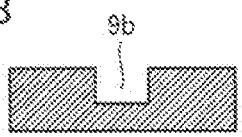
FIG. 16B is a schematic sectional view taken along XVI-XVI of FIG. 16A.

FIG. 16A is a schematic top view illustrating vaporized fuel plate 9 used in fuel battery cell 101. FIG. 16B is a schematic sectional view taken along XVI-XVI of FIG. 16A. Vaporized fuel plate 9 is a member used to form a space for containing the vaporized fuel (i.e., vaporized fuel container 9a) between membrane electrode assembly 4 and liquid-gas separation layer 12. Vaporized fuel plate 9 illustrated in the example of FIG. 2 is disposed between anode moisture-retaining layer 7 and liquid-gas separation layer 12 in contact with anode moisture-retaining layer 7. Vaporized fuel plate 9 has vaporized fuel container 9a that is an opening formed so as to penetrate in a thickness direction thereof, and a communication path 9b communicating vaporized fuel container 9a with outside of vaporized fuel plate 9. Communication path 9b is a path through which the by-product gas (for example, $CO_2$ gas) generated in anode 2 is discharged out of the fuel battery.

In vaporized fuel plate 9 illustrated in FIGS. 16A and 16B, communication path 9b includes a groove (dent) formed in a peripheral edge of vaporized fuel plate 9 and extending from vaporized fuel container 9a to an end surface of the peripheral edge. Communication path 9b has an exit formed on a side surface opposite to the side surface of the fuel battery coupled with fuel distributor 150, for example (see FIG. 4).

When vaporized fuel container 9a is formed on in-cell fuel flow channels 10a with liquid-gas separation layer 12 interposed therebetween, an in-plane density of the vaporized fuel supplied to anode 2 is equalized, and a vaporized fuel quantity is optimized.

The following advantages are also achieved by providing vaporized fuel container 9a.

(i) An air space present in vaporized fuel container 9a achieves heat insulation between the power generating unit (membrane electrode assembly) and in-cell fuel flow channels 10a. This controls the occurrence of crossover due to excessive temperature rises of the liquid fuel in in-cell fuel flow channels 10a, thereby preventing an internal temperature and an internal pressure of the battery from overly increasing.

(ii) The by-product gas (for example $CO_2$ gas) generated in anode 2 reaches in vaporized fuel container 9a with heat induced by power generation and travels through communication path 9b to be discharged out of the fuel battery cell. This greatly reduces a quantity of heat stored in the fuel battery cell, thereby preventing an excessive temperature rise of the whole fuel battery cell including in-cell fuel flow channels 10a. This is another favorable factor that prevents the internal temperature and pressure of the battery from overly increasing. Specifically, communication path 9b (discharge port of the by-product gas) provided in vaporized fuel plate 9 greatly reduces heat transfer to in-cell fuel flow channels 10a. Therefore, unfavorable events, such as an excessive temperature rise of the liquid fuel in in-cell fuel flow channels 10a, crossover associated therewith, and uncontrollable temperature runaway, are more unlikely to occur.

(iii) Since the by-product gas is discharged well through communication path 9b, any troubles in the fuel supply that may be caused by the residual by-product gas can be prevented, and anode 2 can be suitably supplied with the fuel. As a result, stable power generation characteristics can be accomplished. Further, since the by-product gas is discharged smoothly through communication path 9b, the by-product gas can be blocked from entering in-cell fuel flow channels 10a. Accordingly, anode 2 can be reliably supplied with an adequate quantity of vaporized fuel, and an output stability of the fuel battery can be improved.

Vaporized fuel plate 9 has a thickness of about 100 μm to 1,000 μm. Vaporized fuel plate 9 as thin as about 100 μm to 300 μm can still exert the remarkable effects described above.

The through opening of vaporized fuel plate 9 (vaporized fuel container 9a) preferably has an open area ratio as large as possible relative to an area dimension of vaporized fuel plate 9 as illustrated in FIG. 16A in view of heat insulation between the power generating unit and in-cell fuel flow channels 10a. Therefore, vaporized fuel plate 9 preferably has a frame shape (square-like shape) where a through opening as large as possible is formed.

The open area ratio of the through opening, that is, an opening area dimension of the through opening relative to the area dimension of vaporized fuel plate 9 (as described later, vaporized fuel plate 9 may have at least two through openings, and in that case, a total opening area) is preferably greater than or equal to 50% and more preferably greater than or equal to 60%. The open area ratio of the through opening is preferably larger because it enhances the function of vaporized fuel container 9a to equalize a density of the fuel supplied to anode 2 and ensures an adequate supply of fuel to be supplied to anode 2. The open area ratio of the through opening is normally less than or equal to 90%.

Communication path 9b is not limited to the groove (dent) formed in the peripheral edge of vaporized fuel plate 9, but may be a through hole formed so as to penetrate in a thickness direction thereof. However, the groove (dent) is a preferable option in view of structural strength. To improve vaporized fuel plate 9 in strength, communication path 9b preferably has a depth as large as about 75% of the thickness of vaporized fuel plate 9.

Figure 17A:
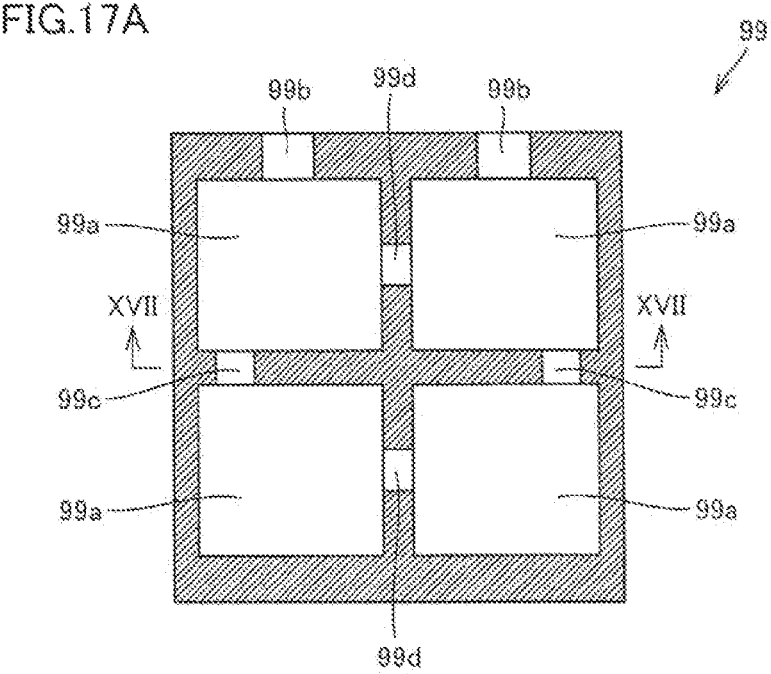
FIG. 17A is a schematic top view illustrating another example of the vaporized fuel plate.
Figure 17B:
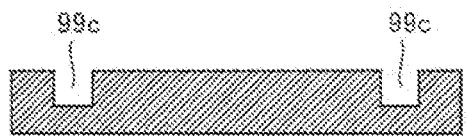
FIG. 17B is a schematic sectional view taken along XVII-XVII of FIG. 17A.

FIG. 17A is a schematic top view illustrating another example of the vaporized fuel plate, and FIG. 17B is a schematic sectional view taken along XVII-XVII of FIG. 17A. As illustrated in FIGS. 17A and 17B, vaporized fuel plate may have at least two through openings. A vaporized fuel plate 99 illustrated in FIGS. 17A and 17B has four through openings 99a in total formed in two rows longitudinally and laterally. This structure may be described such that a large through opening is divided into four openings with beams provided therein longitudinally and laterally. Such a vaporized fuel plate having a plurality of through openings (divided by beams) is improved in in-plane rigidity, providing a fuel battery superior in strength against any physical impacts. As compared to the structures illustrated in FIGS. 16A and 16B where no beams are provided, it is less likely that the through openings of the beam-divided plate is blocked due to thermal expansion by heat transferred from any members above and below the vaporized fuel plate.

The vaporized fuel plate having at least two through openings may have communication paths as many as the through openings, wherein the communication paths are respectively paired with the through openings. The vaporized fuel plate may have communication paths less than the through openings, or communication paths more than the through openings. The example of FIG. 17A illustrates two communication paths 99b for four through openings 99a. Thus, all of the through openings are not necessarily provided with the communication paths, in which case the through openings having no communication paths 99b (two lower through openings 99a in FIG. 17A) are spatially connected to the through openings provided with communication paths 99b (upper through openings 99a in FIG. 17A) by a connection path 99c. Connection path 99c may be a groove (dent) formed in the beam between the through openings, similarly to communication path 99b (see FIG. 17B). When connection paths 99c are provided, the by-product gas entering through the through openings with no communication paths 99b can be discharged outside through communication paths 99b.

In order to more efficiently discharge outside the by-product gas reaching the through openings (vaporized fuel containers) of the vaporized fuel plate, or to more effectively equalize the density of the fuel supplied to anode 2 of the vaporized fuel plate, it is preferable to provide connection paths 99d spatially connecting the through openings provided with communication paths 99b with each other and/or the through openings having no communication paths 99b with each other (see FIG. 17A).

A ratio $S_1/S_0$ of a sectional area dimension of the communication path (a total sectional area dimension when at least two communication paths are provided) $S_1$ to a total area dimension $S_0$ of the side surfaces of the vaporized fuel plate should be larger than 0 to discharge the by-product gas and the resulting heat. More specifically, the ratio $S_1/S_0$ is preferably greater than or equal to 0.002. The ratio is preferably less than 0.3, more preferably less than 0.1, and more preferably less than 0.05. When the ratio is greater than or equal to 0.3, fuel leakage and incursion of air are more likely to occur, making power generation characteristics less stable.

When, for example, one or at least two communication paths are provided in at least one of the four peripheral edges of the vaporized fuel plate to provide all of the communication paths on a side surface of the fuel battery opposite to the side surface thereof coupled with fuel distributor 150, a ratio $S_1/S_2$ of the area dimension of the communication path (a total sectional area dimension when at least two communication paths are provided) $S_1$ to a total area dimension $S_2$ of the side surface in the peripheral edge where the communication path is provided is preferably greater than or equal to 0.008 based on a reason similar to the above.

A material of the vaporized fuel plate may be a plastic material, a metallic material, or a non-porous carbon material. Examples of the plastic material include: polyphenylene sulfide (PPS), polyimide (PI), polymethyl methacrylate (PMMA), acrylonitrile butadiene styrene (ABS), polyvinyl chloride, polyethylene (PE), polyethylene terephthalate (PET), polyether ether ketone (PEEK), polytetrafluoroethylene (PTFE), and polyvinylidene fluoride (PVDF). Examples of the metallic material include: titanium, aluminum, and alloy materials such as stainless steel and magnesium alloy.

Of these examples, the vaporized fuel plate is preferably formed from a material superior in rigidity such as metals, polyphenylene sulfide (PPS), or polyimide (PI). The vaporized fuel plate superior in rigidity can be bonded to any member adjacent thereto by hot press (thermal bond), wherein the fuel battery thickness and power generation characteristics are less variable, and blockage of the communication path is effectively prevented during the hot press.

Although the vaporized fuel plate may be omitted, it is preferable to provide the vaporized fuel plate to achieve the effects described above.

[Liquid-Gas Separation Layer]

Liquid-gas separation layer 12 is provided on an anode 2-side surface of intervening layer 11, which will be described later, between membrane electrode assembly 4 and flow channel plate 10. Liquid-gas separation layer 12 is a hydrophobic porous layer having permeability for the vaporized fuel (permeability for a vaporized matter of the liquid fuel) but not for the liquid fuel. Liquid-gas separation layer 12 is a layer having a liquid-gas separation ability that realizes to feed the vaporized matter of the fuel to anode 2. Liquid-gas separation layer 12 suitably controls (regulates) and equalizes the quantity and the density of the vaporized fuel supplied to anode 2. When liquid-gas separation layer 12 is provided, crossover of the fuel is effectively controlled, and temperature variability is unlikely to occur in the power generator, helping to stabilize power generation characteristics.

Examples of liquid-gas separation layer 12, although not particularly limited as long as it has liquid-gas separation ability for the fuel, may include porous membranes and porous sheets made of polytetrafluoroethylene (PTFE), fluoro-based resins such as polyvinylidene fluoride, and water-repellent silicone resins. Specific examples are "NTF2026A-N06" and "NTF2122A-S06" of "TEMISH (registered trademark)" supplied by Nitto Denko Corporation, which are porous membranes made of polytetrafluoroethylene.

To impart the vaporized fuel permeability and the liquid fuel impermeability to liquid-gas separation layer 12, pores of liquid-gas separation layer 12 preferably have a largest pore size of 0.1 μm to 10 μm, and more preferably 0.5 μm to 5 μm. Similarly to intervening layer 11 described later, the largest pore size can be calculated through measurement of a bubble point by using, for example, methanol. Liquid-gas separation layer 12 normally has a contact angle to water, which will be described later, greater than or equal to 80 degrees or typically greater than or equal to 90 degrees.

Although the thickness of liquid-gas separation layer 12 is not particularly limited, liquid-gas separation layer 12 preferably has a thickness greater than or equal to 20 μm and more preferably greater than or equal to 50 μm. To reduce the fuel battery in thickness, liquid-gas separation layer 12 preferably has a thickness less than or equal to 500 μm and more preferably less than or equal to 300 μm.

[Intervening Layer]

Intervening layer 11 is disposed between liquid-gas separation layer 12 and flow channel plate 10 so as to cover the anode 2-side surface of flow channel plate 10 (grooves (dents) constituting in-cell fuel flow channels 10a). Intervening layer 11 is preferably a hydrophilic layer having a contact angle to water of less than 70 degrees. When such a layer is provided so as to cover in-cell fuel flow channels 10a, the liquid fuel is drawn into in-cell fuel flow channels 10a by the hydrophilic nature of intervening layer 11, and pressure loss of the liquid fuel in in-cell fuel flow channels 10a is thereby reduced. This leads to improvements in efficiency of feeding the liquid fuel to in-cell fuel flow channels 10a, in-plane diffusion of the liquid fuel in flow channel plate 10, efficiency of feeding the vaporized fuel to anode 2, and uniform in-plane feed of the fuel in anode 2. The contact angle of intervening layer 11 to water is measured in compliance with JIS R 3257 (test for wettability of substrate glass surface).

Intervening layer 11 preferably exhibits a capillary action to the liquid fuel, and capillary power is preferably exerted to a relatively large extent so that pressure loss of the liquid fuel in in-cell fuel flow channels 10a is effectively reduced. In view of the above, intervening layer 11 preferably has pores, and the pores preferably have a largest pore size less than or equal to 1 μm, and more preferably less than or equal to 0.7 μm. The largest pore size can be obtained by measuring a bubble point described later or may be measured by mercury penetration. However, since the measurable range of the mercury penetration is limited to a pore distribution in the range of 0.005 μm to 500 μm, the mercury penetration is only available as long as there are no pores beyond the range or the pores beyond the range are ignorably few.

Although not particularly limited, a bubble point when methanol is used as a medium for measurement may be greater than or equal to about 5 kPa in intervening layer 11. To enhance the capillary power, the bubble point is preferably higher. Therefore, the bubble point may be greater than or equal to 30 kPa or greater than or equal to 50 kPa.

According to the embodiment, wherein air bubbles generated in the liquid fuel of in-cell fuel flow channels 10a or the out-cell fuel flow channel during power generation escape through intervening layer 11 and liquid-gas separation layer 12 toward vaporized fuel container 9a to be discharged out of the fuel battery cells, the bubble point of intervening layer 11 is preferably lower. According to the above embodiment, the hydrophilic nature of intervening layer 11 (surface wettability) mostly contributes to the reduction of pressure loss of the liquid fuel in in-cell fuel flow channels 10a.

It is advantageous to provide intervening layer 11 because intervening layer 11 can hold the liquid fuel therein, effectively preventing the by-product gas generated in anode 2 from flowing into in-cell fuel flow channels 10a. When the by-product gas generated in anode 2 is thus prevented from flowing into in-cell fuel flow channels 10a, the by-product gas from the fuel battery can only be discharged through the communication paths of the vaporized fuel plate. As a result, the discharge of the by-product gas and resulting heat from the communication paths is accelerated, and heat transfer to in-cell fuel flow channels 10a is effectively controlled. This effectively prevents the excessive temperature rise of the whole fuel battery including in-cell fuel flow channels 10a, the crossover associated therewith, and the uncontrollable temperature runaway.

The bubble point is a smallest pressure at which air bubbles are detected on a layer (membrane) surface when pneumatic pressure is applied thereto from a back side of the layer (membrane) wetted with a liquid medium. The bubble point ΔP is defined by the following equation (1):

$$\Delta P [Pa] = 4\gamma \cos \theta / d \tag{1}$$

(where γ is a surface tension of the measurement medium [N/m], θ is a contact angle between a layer (membrane) material and the measurement medium, and d is a largest pore size of the layer (membrane). The bubble point according to the present invention is measured in compliance with JIS K 3832, in which methanol is used as the measurement medium.

Intervening layer 11 may be a porous layer made of a polymeric material, a metallic material, or an inorganic material, or a polymeric membrane. Specific examples of intervening layer 11 are listed below.

1) Intervening layer 11 may be a porous layer including any of the following materials: fluoro-based resins such as polyvinylidene fluoride (PVDF) and polytetrafluoroethylene (PTFE); acrylic-based resins; ABS resins; polyolefin-based resins such as polyethylene and polypropylene; polyester-based resins such as polyethylene terephthalate; cellulose-based resins such as cellulose acetate, nitrocellulose, and ion-exchange cellulose; nylon; polycarbonate-based resins; chloride-based resins such as polyvinyl chloride; polyether ether ketone; polyether sulfone; glass; ceramics; and metallic materials such as stainless steel, titanium, tungsten, nickel, aluminum, and steel. The porous layer may be a foamed compact, a sintered compact, an unwoven cloth, or fiber (for example, glass fiber) including any of these materials.

2) Intervening layer 11 may be a polymeric membrane including any of hydrocarbon-based polymers usable as materials of an electrolytic membrane: perfluorosulfonic acid-based polymers; styrene-based graft polymers; trifluorostyrene derivative copolymers; sulfonated polyarylene ether; sulfonated polyether ether ketone; sulfonated polyimide; sulfonated polybenzimidazole; phosphonated polybenzimidazole; and sulfonated polyphosphazene. These polymeric membranes have nano-order pores as intervals between polymers three-dimensionally entangling with one another.

When the hydrophobic materials are selected from these materials and used as a base, the materials are hydrophilized by, for example, introducing hydrophilic functional groups to increase the wettability of pore surfaces to water. Then, the contact angle can be adjusted to less than 70 degrees.

Although the thickness of intervening layer 11 is not particularly limited, intervening layer 11 preferably has a thickness of 20 μm to 500 μm, and more preferably 50 μm to 200 μm, to reduce the fuel battery in thickness.

Fuel battery cells 101 constituting the fuel battery according to the present invention may not include intervening layer 11. In this case, liquid-gas separation layer 12 is directly formed on the anode 2-side surface of flow channel plate 10 so as to cover in-cell fuel flow channels 10a. According to this structure, air bubbles, if generated from dissolved gas of the liquid fuel by temperature increases during power generation, are pushed out toward vaporized fuel container 9a and thereby prevented from blocking in-cell fuel flow channels 10a. Intervening layer 11, if provided, should have a relatively low bubble point as described above or a path should be formed in the fuel battery cells to discharge the air bubbles (path which communicates ends of in-cell fuel flow channels 10a to outside the fuel battery cells).

[Second Intervening Layer]

Figure 18:
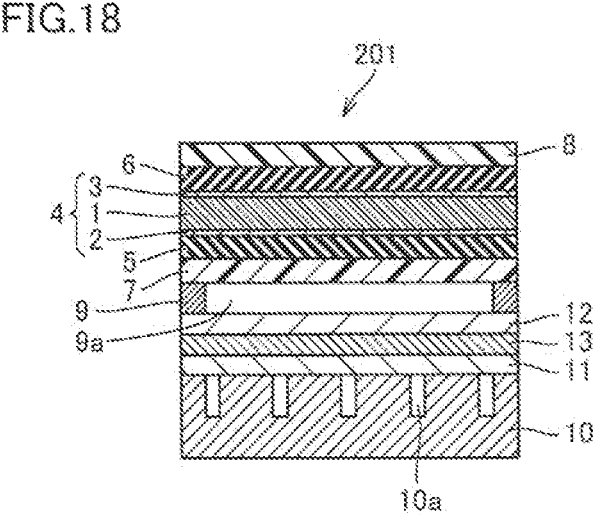
FIG. 18 is a schematic sectional view illustrating another example of a fuel battery cell used in the fuel battery according to the present invention.
Figure 19:
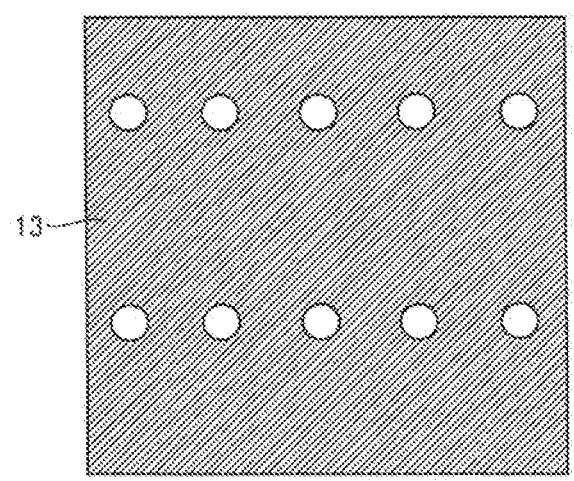
FIG. 19 is a schematic top view illustrating a second intervening layer provided in the fuel battery cell illustrated in FIG. 18.

In the case where intervening layer 11 is provided in fuel battery cell 101, a second intervening layer 13 may be further interposed between intervening layer 11 (hereinafter, may also be referred to as first intervening layer 11) and liquid-gas separation layer 12. FIG. 18 illustrates an example of the fuel battery cell including second intervening layer 13. A fuel battery cell 201 illustrated in FIG. 18 is structured similarly to fuel battery cell 101 illustrated in FIG. 2 except that second intervening layer 13 is interposed between first intervening layer 11 and liquid-gas separation layer 12. FIG. 19 is a schematic top view of second intervening layer 13 used in fuel battery cell 201.

Second intervening layer 13 has through holes formed so as to penetrate in a thickness direction thereof for the liquid fuel to permeate therethrough. Second intervening layer 13 plays a role of making at least first intervening layer 11 and liquid-gas separation layer 12 to firmly adhere to each other. It is preferable that second intervening layer 13 also serve to adjust (regulate) a quantity of liquid fuel permeating therethrough toward liquid-gas separation layer 12. An example of second intervening layer 13 is a non-porous sheet (film) illustrated in FIG. 19 where through holes are formed so as to penetrate in a thickness direction thereof. A preferable material thereof is thermoplastic resins. When the first intervening layer, the second intervening layer, and the liquid-gas separation layer are layered and thermally compressed to be bonded, these layers can be planarly well adhered to one another. The fuel battery cell, in which a non-porous sheet planarly bondable and having through holes formed in the thickness direction thereof is used as second intervening layer 13, has the following advantages.

(i) First intervening layer 11 and liquid-gas separation layer 12 are well adhered to each other with second intervening layer 13 interposed therebetween. Therefore, the by-product gas does not stay between first intervening layer 11 and liquid-gas separation layer 12, and in-plane variability of the vaporized fuel permeating through liquid-gas separation layer 12 is controllable. As a result, anode 2 is uniformly supplied with the fuel to anode 2.

(ii) Depending on the number of through holes formed in second intervening layer 13 and their opening diameters, quantities of the liquid fuel permeating toward liquid-gas separation layer 12 and the vaporized fuel supplied to anode 2 can be suitably adjusted (regulated). This prevents or suppresses the occurrence of crossover of the fuel and stabilizes the fuel supply. Although the number of through holes is not particularly limited, it is preferable to form a plurality of through holes at equal intervals in the surface of second intervening layer 13 in order to make the vaporized fuel to evenly permeate through liquid-gas separation layer 12. The opening size (diameter) of the through hole is, for example, about 0.1 mm to 5 mm.

Examples of second intervening layer 13 other than the thermoplastic resin sheet are described below.

1) Second intervening layer 13 may be a porous layer in which an adhesive resin or resin composition is used, for example, a porous layer in which any of hot-melt adhesives or curing adhesives is used. When any of these adhesives is used, second intervening layer 13 is an adhesive layer, that is, a porous layer including the adhesive or a cured material of the adhesive. The liquid fuel permeating quantity in liquid-gas separation layer 12 is adjusted (regulated) by pores of the porous layer.

2) Second intervening layer 13 preferably includes a non-porous metal plate having through holes formed so as to penetrate in a thickness direction thereof. In this case, an adhesive layer is formed on each of surfaces of the metal plate to ensure good adhesiveness between first intervening layer 11 and liquid-gas separation layer 12. Accordingly, second intervening layer 13 has a three-layered structure including the adhesive layer, the metal plate, and the adhesive layer. The adhesive layer is a porous layer including the adhesive or a cured material of the adhesive. Examples of the adhesive are hot-melt adhesives and curing adhesives. Similarly to the thermoplastic resin sheet, the liquid fuel permeation quantity in liquid-gas separation layer 12 can be adjusted (regulated) by the number of through holes formed in the metal plate and their opening diameters. The adhesive layer is preferably formed not to block the through holes.

[Cathode Moisture-Retaining Layer and Anode Moisture-Retaining Layer]

Cathode moisture-retaining layer 8 is provided on cathode 3, preferably on cathode collector layer 6. Cathode moisture-retaining layer 8 is arbitrarily provided to prevent water generated in cathode 3 from being transpired from cathode 3 and discharged out of the fuel battery cell. When cathode moisture-retaining layer 8 is provided, the water generated in cathode 3 is not transpired from the fuel battery cell but immediately returns to anode 2 through electrolytic membrane 1 to be effectively used in reactions in anode 2.

Anode moisture-retaining layer 7 is provided between anode 2 or anode collector layer 5 and vaporized fuel container 9a. Anode moisture-retaining layer 7 is arbitrarily provided to prevent water generated in anode 2 from being transpired from anode 2 and discharged out of the membrane electrode assembly (for example, to vaporized fuel container 9a) and to retain the water in anode 2. When anode moisture-retaining layer 7 is provided, the water generated in cathode 3 and collected in anode 2 through electrolytic membrane 1 does not transpire from the membrane electrode assembly but favorably stays in anode 2. The water thus kept in anode 2 can be effectively used in reactions in anode 2. Therefore, the reactions in anode 2 are more efficiently performed, and remarkable power generation characteristics can be reliably accomplished. This effect is more markedly obtained when anode moisture-retaining layer 7 is used in combination with cathode moisture-retaining layer 8.

Cathode moisture-retaining layer 8 and anode moisture-retaining layer 7 greatly contribute to prevention of electrolytic membrane 1 from drying and also to prevention of resulting cell resistance increases and deterioration of power generation characteristics.

Cathode moisture-retaining layer 8 and anode moisture-retaining layer 7 are made of any materials that are gas-permeable to allow the vaporized fuel or oxidants (such as air) from outside of the fuel battery to permeate through these layers, insoluble in water, and water-retainable (capable of preventing water transpiration). Specifically, cathode moisture-retaining layer 8 and anode moisture-retaining layer 7 may be porous membranes (porous layers) in which the following materials, for example, are used: fluoro-based resins such as polyvinylidene fluoride (PVDF) and polytetrafluoroethylene (PTFE); acrylic-based resins; polyolefin-based resins such as polyethylene and polypropylene; polyester-based resins such as polyethylene terephthalate; polyurethane-based resins, polyamide-based resins; polyacetal-based resins; polycarbonate-based resins; chloride-based resins such as polyvinyl chloride; polyether-based resins; polyphenylene-based resins; and water-repellent silicone resins. Other examples of these moisture-retaining layers may include: polymeric foam, fiber bundle, woven fiber, unwoven fiber, or any of combinations of these examples.

Cathode moisture-retaining layer 8 is desirably water-retainable (capable of preventing water transpiration) and gas-permeable so that oxidants (for example, air) from outside of the fuel battery is permeable therethrough. To meet the requirements, the porosity of cathode moisture-retaining layer 8 is preferably greater than or equal to 30% and less than or equal to 90%, and more preferably greater than or equal to 50% and less than or equal to 80%. When the porosity is greater than 90%, it is difficult for the water generated in cathode 3 to be kept inside the fuel battery cell. On the other hand, when the porosity is less than 30%, diffusion of the oxidants (such as air) from outside of the fuel battery is disturbed, and power generation characteristics of cathode 3 is easily deteriorated.

Anode moisture-retaining layer 7 is desirably water-retainable (capable of preventing water transpiration) and gas-permeable so that the vaporized fuel and the by-product gas (for example, $CO_2$ gas) generated in the catalytic layer is permeable therethrough. Therefore, the porosity of anode moisture-retaining layer 7 is preferably greater than or equal to 50% and less than or equal to 90%, and more preferably greater than or equal to 60% and less than or equal to 80%. When the porosity is greater than 90%, it difficult for the water generated in cathode 3 and collected in anode 2 through electrolytic membrane 1 to be kept inside the membrane electrode assembly. On the other hand, when the porosity is less than 50%, diffusion of the vaporized fuel and the by-product gas (such as $CO_2$ gas) generated in the catalytic layer is disturbed, and power generation characteristics of anode 2 is easily deteriorated.

To calculate the porosities of cathode moisture-retaining layer 8 and anode moisture-retaining layer 7, volumes and weights of these moisture-retaining layers are measured, and specific gravities of these moisture-retaining layers are then obtained and assigned to the following equation (2) with the specific gravity of the material.

$$\text{Porosity}(\%) = [1 - (\text{specific gravity of moisture-retaining layer/specific gravity of material}) \times 100 \quad (2)$$

Although the thicknesses of cathode moisture-retaining layer 8 and anode moisture-retaining layer 7 are not particularly limited, these layers are preferably greater than or equal to 20 μm, and more preferably greater than or equal to 50 μm in order to fully exert the expected effects. To reduce the fuel battery in thickness, the thicknesses are preferably less than or equal to 500 μm and more preferably less than or equal to 300 μm.

Cathode moisture-retaining layer 8 and anode moisture-retaining layer 7 are desired to have water repellency so that they does not have high water absorbency and water in liquid form once absorbed and retained is not released therefrom. Therefore, cathode moisture-retaining layer 8 and anode moisture-retaining layer 7 are preferably selected from porous membranes (porous layers) made of fluoro-based resins such as polyvinylidene fluoride (PVDF) and polytetrafluoroethylene (PTFE), and water-repellent silicone resins. Specific examples of the membrane include "NTF2026A-N06" and "NTF2122A-S06" of "TEMISH (registered trademark)" supplied by Nitto Denko Corporation, which are porous membranes made of polytetrafluoroethylene.

Anode moisture-retaining layer 7 is preferably provided on anode collector layer 5 formed on anode 2 in contact with anode collector layer 5, so that the water content of anode 2 is more effectively prevented from being transpired from the membrane electrode assembly.

Cathode moisture-retaining layer 8 and anode moisture-retaining layer 7 are provided according to need, therefore, one of these layers may be omitted.

(2) Fuel Distributor

Fuel distributor 150 is a member independent from fuel battery cells 101 to distribute the liquid fuel introduced through inlet port 151 to the fuel battery cells. Fuel distributor 150 has out-cell fuel flow channel 155 connected to in-cell fuel flow channels 10a. Thus, the fuel flow channels (in-cell fuel flow channels) which spread the liquid fuel immediately below the anode is embedded in the fuel battery cell as an integral unit thereof, while the fuel flow channel (out-cell fuel flow channel) to distribute the liquid fuel to the fuel battery cells is provided as a member independent from the fuel battery cell. As a result, the fuel battery cell can be modularized.

As illustrated in FIG. 3, out-cell fuel flow channel 155 may include main flow channel 152 connected to inlet port 151 formed in an upper surface thereof, and branched flow channels 153 connecting main flow channel 152 to the in-cell fuel flow channels. Fuel distributor 150 may have only one inlet port 151 or may have at least two inlet ports 151. Fuel distributor 150 may be a hollow member such as a tank, wherein inlet port 151 is formed in an upper surface, and through holes communicating with the in-cell fuel flow channels are formed in a side surface coupled with the fuel battery cell (hollow portion corresponds to the main flow channel, and the through holes correspond to the branch channels).

The outer shape of fuel distributor 150 is not particularly limited, and may have an appropriate shape in view of different shapes and areas of fuel battery housing spaces, the number of modules (fuel battery cells), and different layout patterns of electronic devices to which the fuel battery is applied. Fuel distributor 150 may be formed from various plastic materials, metallic materials, and alloy materials.

Inlet port 151 is generally connected a fuel tank (not illustrated) where the liquid fuel supplied to the flow channels is stored. The fuel is generally supplied from the fuel tank to the out-cell fuel flow channel and the in-cell fuel flow channels by means of a feeder pump, however, may be passively supplied without using the feeder pump.

(3) Coupling of Fuel Battery Cell and Fuel Distributor

As illustrated in the embodiment of FIGS. 1 to 4, all of entry end portions of in-cell fuel flow channels 10a are located on side surface X of fuel battery cell assembly 110 linearly arranged, and all of exit end portions of out-cell fuel flow channel 155 of fuel distributor 150 are located on side surface Y of fuel distributor 150, and fuel distributor 150 is positionally set on a lateral side of linear fuel battery cell assembly 110 so that side surfaces X and Y face each other. In this case, if necessary, a gasket (for example, double stick tape) is provided to connected parts between in-cell fuel flow channels 10a and out-cell fuel flow channel 155 and these connected parts are further secured by fastening with screws so that the fuel battery cell and the fuel distributor are coupled with each other.

When flow channel plate 10 illustrated in FIG. 8 is used, a section of flow channel plate 10 where the entry end portions of in-cell fuel flow channels 10a are provided is overlapped with a section of fuel distributor 150 where the exit end portions of out-cell fuel flow channel 155 are provided, and if necessary, a gasket (for example, double stick tape) is provided to the connected parts of in-cell fuel flow channels 10a and out-cell fuel flow channel 155, and the fuel battery cell and the fuel distributor can be coupled with each other by fastening with screws.

4) Types of Fuel Battery

The fuel battery according to the present invention may be a solid polymer fuel battery or a direct alcohol fuel battery. The present invention is particularly suitable for a direct alcohol fuel battery (particularly, direct methanol fuel battery). Examples of the liquid fuel usable in the fuel battery according to the present invention include: alcohols such as methanol and ethanol; acetals such as dimethoxymethane; carboxylic acids such as formic acid; esters such as formic acid methyl; and aqueous solutions containing any of these materials. The liquid fuel is not limited to one of these materials, and at least two of the materials may be combined and used. The methanol aqueous solution and pure methanol are preferable examples in view of low cost, high energy density per unit volume, and high power generation efficiency. The oxidizing gas supplied to the cathode is preferably air or oxygen gas, and air is particularly suitable.

The fuel battery according to the present invention is suitably used as a power source in electronic devices, particularly suitably used as a power source in downsized electronic devices, typically mobile devices such as mobile telephones, electronic notebooks, and laptop personal computers.

EXAMPLE

Hereinafter, the present invention will be described in further detail with reference to Example. The present invention, however, is not limited to Example below.

Example 1

Figure 20:
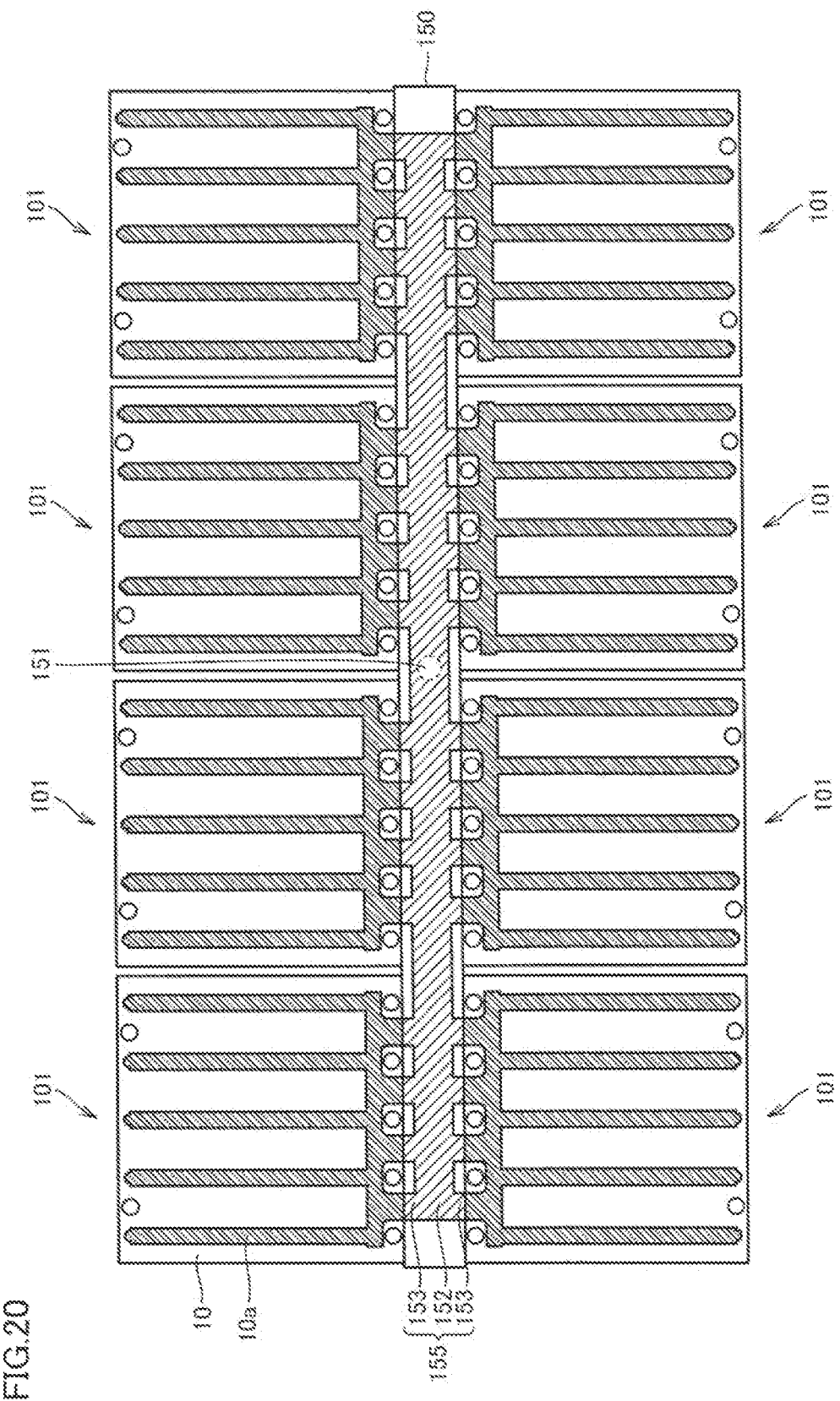
FIG. 20 is a schematic sectional view illustrating a fuel battery produced in Example 1.

A fuel battery structured as illustrated in FIG. 20 was produced in the following steps. FIG. 20 is a schematic sectional view of the fuel battery similarly to FIG. 3, illustrating shapes of an out-cell fuel flow channel and in-cell fuel flow channels. The planarly integrated fuel battery produced in the present example is similar to the fuel battery illustrated in FIG. 5 except that four fuel battery cells are linearly disposed in two rows. The rows of cells are respectively coupled with two opposite side surfaces of fuel distributor 150. Out-cell fuel flow channel 155 has branched flow channels 153 extending from main flow channel 152 toward the side surfaces to be connected to the in-cell fuel flow channels in two rows. The cell structure of fuel battery cells 101 used in the present example is similar to the structure illustrated in FIG. 2.

(1) Production of Membrane Electrode Assembly

The following materials by given percentages were put in a container made of a fluoro-based resin: catalyst-supported carbon particles having Pt loading of 32.5 wt. % and Ru loading of 16.9 wt. % (TEC66E50, supplied by Tanaka Holdings Co., Ltd.), an alcohol solution containing electrolyte NAFION (registered trademark) by 20 wt. % (supplied by Sigma-Aldrich Co.), n-propanol, isopropanol, and zirconia balls. The materials were then mixed by an agitator at 500 rpm for 50 minutes to produce a catalyst paste for anode. Further, a catalyst paste for cathode was prepared in a manner similar to the production of the anode catalyst paste except that catalyst-supported carbon particles having Pt loading of 46.8 wt. % (TEC10E50E, supplied by Tanaka Holdings Co., Ltd.) were used.

Then, a sheet of carbon paper having a water-repellent porous layer formed on one of surfaces thereof (25BC, supplied by SGL Group) was cut in the size of 35 mm in length and 40 mm in width. The anode catalyst paste was applied to the porous layer by using a screen printing plate having a window of 30 mm in length and 35 mm in width so that the catalyst loading was about 3 mg/cm$^2$, and then dried to obtain anode 2 having a thickness of about 200 μm where an anode catalytic layer was formed at the center of the carbon paper prepared as an anode conductive porous layer. The cathode catalyst paste was applied to the porous layer of another carbon paper of the same size by using the screen printing plate having the 30×35 mm window so that the catalyst loading was about 1 mg/cm$^2$, and then dried to obtain cathode 3 having a thickness of about 70 μm where a cathode catalytic layer was formed at the center of the carbon paper prepared as a cathode conductive porous layer.

Next, an ion-exchange membrane including perfluorosulfonic acid as thick as about 175 μm (NAFION (registered trademark) 117, supplied by DuPont) was cut in the size of 35 mm in length and 40 mm in width and used as electrolytic membrane 1. Anode 2, electrolytic membrane 1, and cathode 3 were stacked on one another in this order so that the catalytic layers face electrolytic membrane 1. Then, the laminated structure was thermally compressed to be bonded at 130° C. for two minutes, so that anode 2 and cathode 3 were bonded to electrolytic membrane 1. The anode, electrolytic membrane, and cathode were stacked on one another so that in-plane positions of anode 2 and cathode 3 on electrolytic membrane 1 were equal and centers of anode 2, electrolytic membrane 1, and cathode 3 were positionally matched with one another. An outer peripheral portion of the obtained laminated structure was cut to obtain membrane electrode assembly (MEA) 4 in the size of 22 mm in length and 26 mm in width.

(2) Stacking of Collector Layers

A stainless steel plate (NSS445M2, supplied by Nisshin Steel Co., Ltd.) in the size of 26.5 mm in length, 27 mm in width, and 0.1 mm in thickness was prepared. A plurality of holes having an opening diameter φ of 0.6 mm (opening pattern: zigzag through 60°, pitch: 0.8 mm) were formed in a central region of the plate from both surfaces thereof by wet etching using a photo resist mask. In this manner, two stainless steel plates each having a plurality of through holes formed so as to penetrate in a thickness direction thereof were produced and respectively used as anode collector layer 5 and cathode collector layer 6.

Then, anode collector layer 5 was provided on anode 2 with an electrically conductive adhesive layer including carbon particles and an epoxy resin interposed therebetween, and cathode collector layer 6 was provided on cathode 3 with the same electrically conductive adhesive layer interposed therebetween. The laminated structure was then thermally compressed and thereby bonded to produce an MEA-collector layers laminated structure.

(3) Bonding of Moisture-Retaining Layer

As anode moisture-retaining layer 7 and cathode moisture-retaining layer 8 were prepared two porous films made of polytetrafluoroethylene (TEMISH (registered trademark) NTF2122A-S06, supplied by Nitto Denko Corporation, 22 mm in length, 26 mm in width, and 0.2 mm in thickness, porosity of 75%). These moisture-retaining layers were further provided on anode collector layer 5 and cathode collector layer 6 of the MEA-collector layers laminated structure with an adhesive layer made of polyolefin interposed therebetween, and thermally compressed and thereby bonded. The moisture-retaining layers were bonded so that the layers are located immediately above or below the MEA.

(4) Bonding Intervening Layer with Liquid-Gas Separation Layer

As intervening layer 11 was used a porous film made of polyvinylidene fluoride in the size of 26.5 mm in length, 27 mm in width, and 0.1 mm in thickness (Durapore Membrane Filter, supplied by Nihon Millipore K.K.). The porous film had a contact angle to water of less than 70 degrees. The largest pore size of the porous film was 0.1 μm, and the bubble point thereof in compliance with JIS K 3832 was 115 kPa when methanol was used as a measurement medium.

As liquid-gas separation layer 12 was used a porous film made of polytetrafluoroethylene in the size of 26.5 mm in length, 27 mm in width, and 0.2 mm in thickness ("NTF2122A-S06" of "TEMISH (registered trademark)", supplied by Nitto Denko Corporation). The porous film had a contact angle to water of about 120 degrees. The bubble point of the porous film in compliance with JIS K 3832 was 18 kPa when methanol was used as a measurement medium.

Liquid-gas separation layer 12 was provided on intervening layer 11, and inter-layer parts on all of the side surfaces were bonded with an adhesive.

(5) Bonding of Vaporized Fuel Plate

A vaporized fuel plate 99 produced from SUS in the size of 26.5 mm in length, 27 mm in width, and 0.2 mm in thickness was formed by etching in the shape illustrated in FIGS. 17A and 17B (communication paths 99b and connection paths 99c and 99d were all grooves (dents)). The open area ratio of four through holes 99a in total was 63%, and a ratio of a total sectional area dimension of two communication paths 99b to a total area dimension of side surfaces of the vaporized fuel plate was 0.04. Intervening layer 11 and liquid-gas separation layer 12 bonded to each other were provided on a surface of vaporized fuel plate 99 opposite to the surface where the grooves were formed so that liquid-gas separation layer 12 faced vaporized fuel plate 99, and thermally compressed and thereby bonded.

(6) Bonding of Flow Channel Plate

Flow channel plate 10 produced from SUS was prepared. Flow channel plate 10 was formed in the size of 26.5 mm in length, 27 mm in width, and 0.6 mm in thickness and had in-cell fuel flow channels 10a having such a flow channel pattern as illustrated in FIG. 20 (flow channel: 1.5 mm in width, and 0.4 mm in depth). Flow channel plate 10 was provided on intervening layer 11 of the laminated structure of vaporized fuel plate 99, liquid-gas separation layer 12, and intervening layer 11 with a polyolefin-based adhesive interposed therebetween, and subjected to thermal compression, so that the laminated structure was bonded to flow channel plate 10.

(7) Production of Fuel Battery Cell

The MEA-collector layers laminated structure having the moisture-retaining layers produced above was provided on vaporized fuel plate 99 and subjected to thermal compression, so that the laminated structure was bonded to vaporized fuel plate 99. Finally, an epoxy resin was applied to side surfaces thereof and cured to form a sealing layer. As a result, fuel battery cell 101 was produced. In this manner, a total of eight fuel battery cells 101 were obtained.

(8) Production of Fuel Distributor

Figure 21:
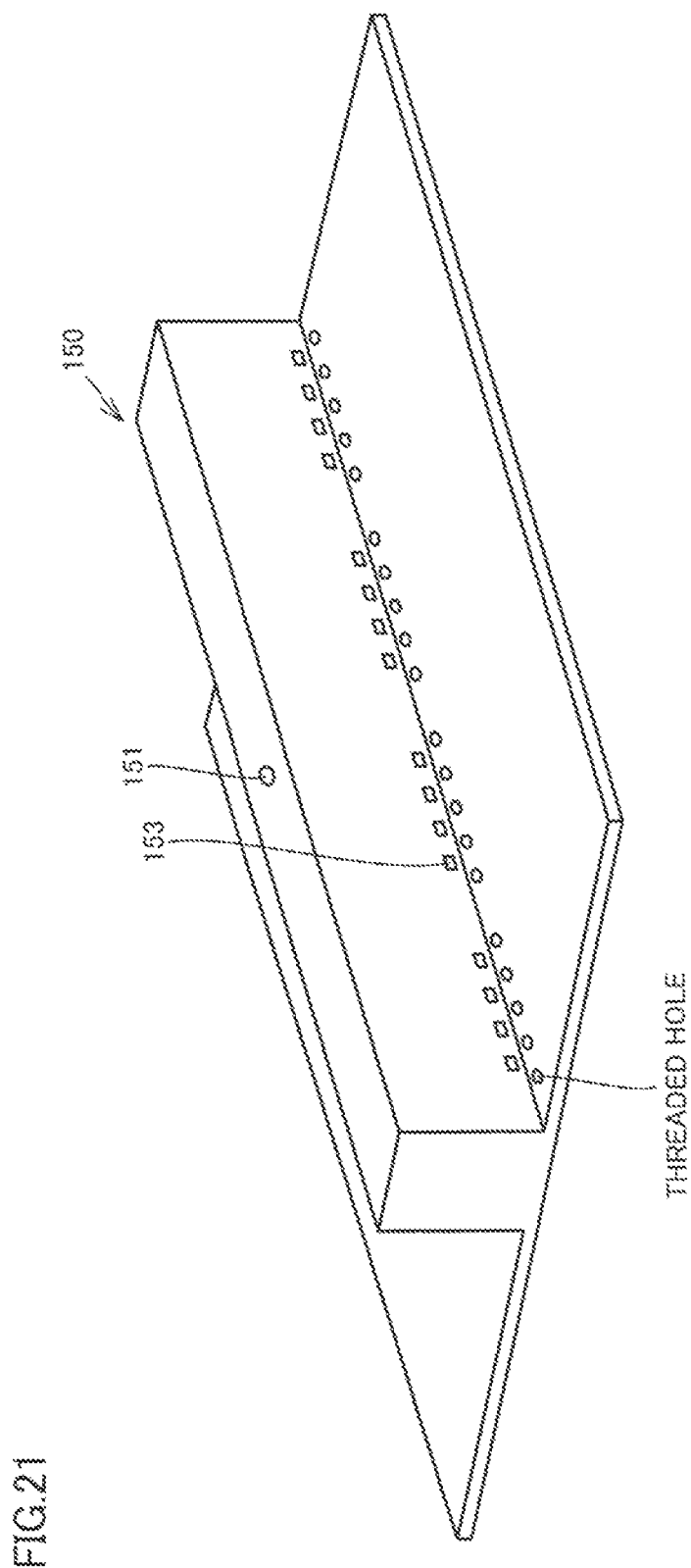
FIG. 21 is a schematic perspective view illustrating a fuel distributor used in Example 1.

Fuel distributor 150 produced from polyphenylene sulfide (PPS) was prepared. Fuel distributor 150 had such an outer shape as illustrated in FIG. 21 (outer shape: 56 mm in length, 110 mm in width, and 50 mm in height) and had out-cell fuel flow channel 155 formed in such a pattern as illustrated in FIG. 20. Inlet port 151 was formed at a longitudinal central position in an upper surface of a projected portion. Inlet port 151 is a through hole communicating with main flow channel 152 of out-cell fuel flow channel 155.

(9) Production of Planarly Integrated Fuel Battery

As illustrated in FIG. 20, eight fuel battery cells 101 and fuel distributor 150 were coupled with each other (so that threaded holes of these two members were positionally consistent) to produce a planarly integrated fuel battery. To avoid any liquid leakage through connected parts of the in-cell fuel flow channels and the out-cell fuel flow channel, fuel battery cells 101 and fuel distributor 150 were secured to each other by applying a double stick tape to contacting surfaces of the fuel battery cells and the fuel distributor, and further fastening these members with screws (circles illustrated in FIG. 20 denote threaded holes).

(Assessment of Power Generation Characteristics of Fuel Battery)

Figure 22:
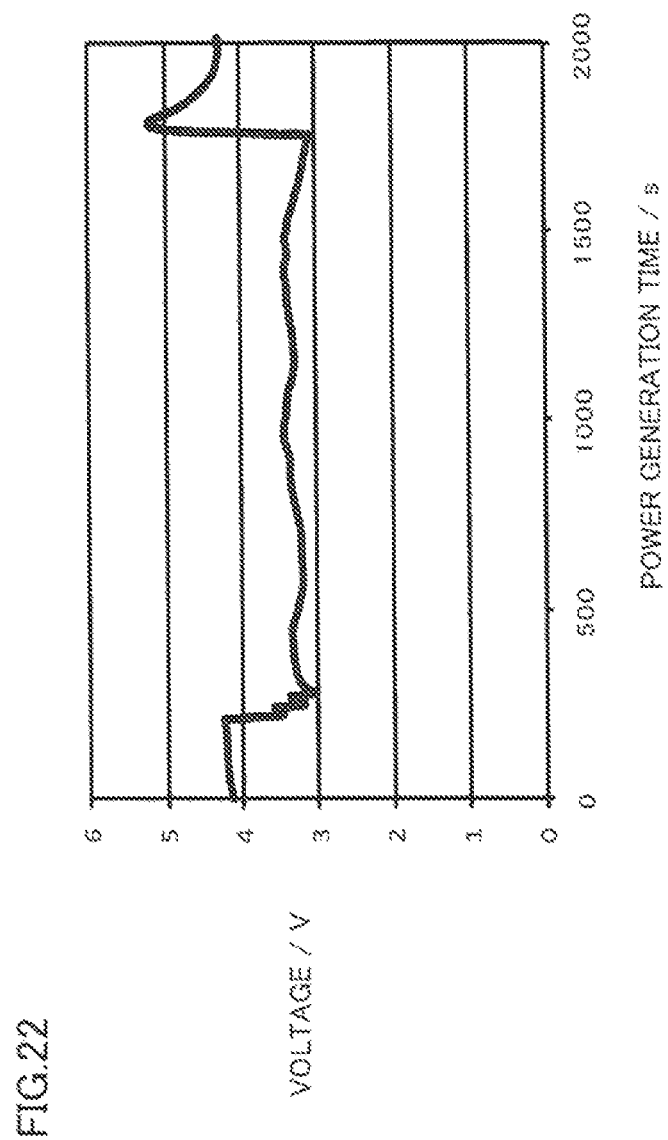
FIG. 22 is a graph illustrating an output voltage variation measured in the fuel battery produced in Example 1.

A methanol aqueous solution having the methanol concentration of 20 M was used as fuel. The fuel was supplied through inlet port 151 to out-cell fuel flow channel 155 and then in-cell fuel flow channels 10a by a feeder pump to make the fuel battery generate power, and an output voltage variation was measured for 2,000 seconds after the power generation started. FIG. 22 shows a measurement result. A value of current fetched from the fuel battery was increased in stages after the start of power generation, and was set to the constant current of 0.3 A in about 250 seconds to 1,750 seconds after the start of power generation. As illustrated in FIG. 22, the output voltage was stable at voltage levels of greater than or equal to 3 V during the operation at the constant current of 0.3 A. Thus, it was confirmed that the fuel battery had favorable power generation characteristics.

What is claimed is:

1. A fuel battery comprising:
   a fuel battery cell assembly having at least two fuel battery cells coplanarly disposed, the fuel battery cell including a membrane electrode assembly having an anode, an electrolytic membrane, and a cathode stacked on one another in this order, and a flow channel plate provided on an anode side and having on an anode-side surface thereof an in-cell fuel flow channel through which liquid fuel flows;
   a fuel distributor having an out-cell fuel flow channel connected to each of the in-cell fuel flow channels to distribute said liquid fuel to the fuel battery cells;
   wherein the fuel battery cell assembly includes at least two fuel battery cells linearly disposed;
   wherein the fuel distributor is disposed on a lateral side of the fuel battery cell assembly and along an array direction of the at least two fuel battery cells linearly disposed; and
   wherein said fuel battery cells further include:
   a liquid-gas separation layer disposed between said membrane electrode assembly and said flow channel plate and having permeability for a vaporized matter of said liquid fuel; and
   an intervening layer disposed between said liquid-gas separation layer and said flow channel plate so as to cover said in-cell fuel flow channels and having a contact angle to water of less than 70 degrees.

2. The fuel battery according to claim 1, wherein said fuel distributor has an inlet port for introducing said liquid fuel, and
   said out-cell fuel flow channel includes a main flow channel connected to said inlet port, and branched flow channels connecting said main flow channel to each of the in-cell fuel flow channels.

3. The fuel battery according to claim 1, wherein all of end portions of the in-cell fuel flow channels provided in said at least two fuel battery cells connected to said out-cell fuel flow channel are located on a side surface of said fuel battery cell assembly, all of end portions of the out-cell fuel flow channel provided in said fuel distributor connected to said in-cell fuel flow channels are located on a side surface of said fuel distributor, and said fuel distributor is disposed such that said side surface of said fuel battery cell assembly and said side surface of said fuel distributor face each other.

4. The fuel battery according to claim 1, wherein all of end portions of the in-cell fuel flow channels provided in said at least two fuel battery cells connected to said out-cell fuel flow channel are located on a main surface of said flow channel plate, all of end portions of the out-cell fuel flow channel provided in said fuel distributor connected to said in-cell fuel flow channels are located on a surface of said fuel distributor, and said fuel distributor is disposed to partly overlap with said flow channel plate such that said end portions of said in-cell fuel flow channels are located on said end portions of the out-cell fuel flow channel.

5. The fuel battery according to claim 1, wherein the liquid-gas separation layer is disposed on the anode-side surface of said flow channel plate so as to cover said in-cell fuel flow channels and having permeability for a vaporized matter of said liquid fuel.

6. The fuel battery according to claim 1, wherein said fuel battery cells further include:

an anode collector layer disposed on said anode; and a cathode collector layer disposed on said cathode.

7. The fuel battery according to claim 1, wherein said fuel battery is a direct alcohol fuel battery.

\* \* \* \* \*